(12) United States Patent
Hagersten et al.

(10) Patent No.: US 11,138,121 B2
(45) Date of Patent: Oct. 5, 2021

(54) SYSTEMS AND METHODS FOR EFFICIENT CACHELINE HANDLING BASED ON PREDICTIONS

(71) Applicant: Samsung Electronics Co., Ltd., Suwon-si (KR)

(72) Inventors: Erik Ernst Hagersten, Uppsala (SE); Andreas Karl Sembrant, Uppsala (SE); David Black-Schaffer, Uppsala (SE)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/192,138

(22) Filed: Nov. 15, 2018

(65) Prior Publication Data

US 2019/0155736 A1 May 23, 2019

Related U.S. Application Data

(60) Provisional application No. 62/588,715, filed on Nov. 20, 2017.

(51) Int. Cl.
*G06F 12/0871* (2016.01)
*G06F 12/0811* (2016.01)
(Continued)

(52) U.S. Cl.
CPC ...... *G06F 12/0871* (2013.01); *G06F 12/0811* (2013.01); *G06F 12/0846* (2013.01);
(Continued)

(58) Field of Classification Search
USPC ........................................................ 711/118
See application file for complete search history.

(56) References Cited

U.S. PATENT DOCUMENTS 7,287,122 B2 * 10/2007 Rajamony ........... G06F 12/0813
711/118
2010/0115204 A1 5/2010 Li et al.
(Continued)

FOREIGN PATENT DOCUMENTS

JP 2004-192403 A 7/2004
JP 2005-084999 A 3/2005

OTHER PUBLICATIONS

Chisti, et al; "Distance Associativity for High-Performance Energy-Efficient Non-Uniform Cache Architectures"; School of Electrical and Computer Engineering, Purdue University. Dec. 3-5, 2003 (Year: 2003).*

(Continued)

*Primary Examiner* — Michael Krofcheck
*Assistant Examiner* — John Francis Wojton
(74) *Attorney, Agent, or Firm* — Harness, Dickey & Pierce, P.L.C.

(57) ABSTRACT

A data management method for a processor to which a first cache, a second cache, and a behavior history table are allocated, includes tracking reuse information learning cache lines stored in at least one of the first cache and the second cache; recording the reuse information in the behavior history table; and determining a placement policy with respect to future operations that are to be performed on a plurality of cache lines stored in the first cache and the second cache, based on the reuse information in the behavior history table.

13 Claims, 11 Drawing Sheets

(51) Int. Cl.
*G06F 12/126* (2016.01)
*G06F 12/0846* (2016.01)
*G06F 12/0897* (2016.01)

(52) U.S. Cl.
CPC ........ *G06F 12/0897* (2013.01); *G06F 12/126* (2013.01); *G06F 2212/271* (2013.01); *G06F 2212/6046* (2013.01)

(56) References Cited

U.S. PATENT DOCUMENTS

| | | |
|---|---|---|
| 2010/0275049 A1 | 10/2010 | Balakrishnan et al. |
| 2014/0351518 A1 | 11/2014 | Chang et al. |
| 2015/0143046 A1 | 5/2015 | Hagersten et al. |
| 2015/0347297 A1* | 12/2015 | Hagersten ........... G06F 12/0846 711/119 |

OTHER PUBLICATIONS

European Search Report for European Patent Application No. 18207191.0 dated Apr. 15, 2019.

* cited by examiner

SYSTEMS AND METHODS FOR EFFICIENT CACHELINE HANDLING BASED ON PREDICTIONS

CROSS-REFERENCE TO RELATED APPLICATION

This non-provisional application claims priority under 35 U.S.C. § 119 to U.S. Provisional Application No. 62/588,715, filed on Nov. 20, 2017, in the U.S. Patent and Trademark Office, the disclosure of which is incorporated herein in its entirety by reference.

BACKGROUND

1. Field

At least some example embodiments of the inventive concepts relate, generally, to methods and systems for accessing data in computer memory devices and, more particularly, mechanisms and techniques for predicting behavior of data units and to apply modifications or, alternatively, optimizations based on these predictions.

2. Description of Related Art

Today's processors are often equipped with caches that can store copies of the data and instructions stored in some high-capacity memory. A popular example today of such high-capacity memory is dynamic random access memory (DRAM). Herein, the term "memory" will be used to collectively refer to all existing and future memory implementations. Cache memories, or "caches" for short, are typically built from much smaller and much faster memory than other memory implementations and can subsequently only hold copies of a fraction of the data stored in main memories or secondary storage devices at any given time. Today, caches are often implemented using SRAM and large caches can be implemented using DRAM. The caches described herein can be implemented using any existing and future memory technology.

Often, the memory system of a computer system includes a range of caches, with larger and slower caches (here referred to as higher-level caches) close to the main memory and smaller and faster caches (here referred to as lower-level caches) closer to the processor. This configuration is typically referred to as a cache hierarchy, memory hierarchy or memory system. Each level in the cache hierarchy is referred to as a cache level. FIG. 1 is a block diagram illustrating a portion of a computer system. In the example illustrated in FIG. 1, the computer system is a multi-processor system, where each CPU 101 is assigned its own first-level private cache 102 (L1 cache). More detailed examples of the CPU 101 and the L1 cache 102 are described below with reference to FIG. 2. A private cache is a cache where space for a data unit can only be in response to an activity of a CPU local to the cache (or a CPU in the same node as the cache, where the cache is private to that node). In this example, the second-level cache 103 is shared by all the CPUs 101 and may contain data and instructions that are accessed by all of the CPUs 101. Cache 103 is a global cache, since space for a data unit can be made in response to activities of any CPU 101. Furthermore, cache 103 is a shared cache, since each data unit can only exist in one shared copy (while each private cache can have its own replicated copy). Memory 105 also stores instructions and data that are accessed by all CPUs 101. The (main) memory 105 is typically accessed using a physical address, or PA for short, while the addresses generated by a CPU 101 are typically virtual addresses. Computer systems with several CPUs and several private caches, such as the system shown in FIG. 1, need efficient mechanisms for finding a requested data unit in one of the caches as well as for keeping the multiple copies of a datum stored in different nodes coherent.

Such computer systems will also typically include one or more secondary storage devices in addition to main memory and cache memory. These secondary storage devices can include one or more of hard drives, optical drives, flash drives or the like, which are collectively represented here by disk 104. The disk or secondary storage 104 may store several orders of magnitude more data than the memory 105, but is not directly accessible using a physical address. If a CPU 101 wants to access data stored on the disk 104, a virtual memory system (not shown in FIG. 1) moves a chunk of data, typically referred to as a page, from the disk 104 to the memory 105 and creates a translation from virtual addresses corresponding to that page to physical addresses. A special kind of translation cache (not shown in FIG. 1), typically called a "translation look-aside buffer" or TLB for short, caches the translation mappings from virtual pages to physical pages. The virtual memory system can be viewed as a caching system, which stores a portion of the data located in the disk 104 in the memory 105.

FIG. 2 is a block diagram for explaining an example cache hierarchy of a computer system. FIG. 2 shows a more detailed view of the cache organization from FIG. 1, where the CPU 204 is shown to contain several cache-like structures, such as the Instruction TLB (ITLB, 201) and Data TLB (DTLDB, 205), and a CPU core 202. The level 1 cache 102 is shown as including an instruction cache 200 and a data cache 206, interposed between the CPU 204 and the level 2 (and potentially higher level) caches 207. FIG. 2 also shows a high-capacity memory 208 connected to the cache hierarchy. Though, the computer system in FIG. 2 is illustrated as a uni-processor (i.e., one-processor) system, the computer system in FIG. 2 may be a portion of a multi-processor system.

When a CPU 101 requests data that is present in the cache, referred to as a cache hit, that request can be serviced much faster than an access to data that is not present in the cache, referred to as a cache miss. Typically, an application running on the CPU 101 that experiences fewer cache misses will execute more quickly and consume less energy than if the same application which suffers from more cache misses, assuming that the two versions of the application otherwise have similar properties. Therefore, considerable effort has been invested in techniques for avoiding cache misses, and also to design implementations that can make cache hits and cache misses efficient with respect to both their access latency and the energy that these memory transactions consume.

In order to understand how to develop solutions to this cache hit/miss problem, some understanding of cache organization and terminology will be useful. Typically, data are installed into caches in fixed chunks that are larger than the word size of a processor, known as cache lines. Common cache line sizes today are, for example, 32, 64 and 128 bytes, but as will be appreciated by those skilled in the art both larger and smaller cache line sizes exist for various cache implementations. The cache line size may also be variable for some cache implementations.

A common way to organize the data placement in memory 208 is in a manner that each data word is statically mapped to reside in one specific cache line. Each cache typically has an index function that identifies a portion of the cache where each cache line can reside, known as a set. The set may contain space to hold one or more cache lines at the same time. The number of cache lines which the set can hold is referred to as its associativity. Often, the associativity for all of the sets in a cache is the same. Such caches are often referred to as set-associative caches. The associativity may also vary between the sets. Each of the spaces in a set that can hold a cache line is referred to as a way.

In order to determine the identity of each cache line stored in each set, cache lines in a cache each have some identifier associated with them. One common example of such an identifier is an address tag. When looking for a specific cache line in a cache, its address may be used to determine the set of the cache where it may reside. The address tags of the cache lines of the corresponding set are compared to a tag portion of the address used to identify a cache line (see, e.g., TAG and ATAG depicted in FIG. 3 and described below) to determine if the desired cache line resides in the cache, and if so, in which way it resides, i.e., in which of the spaces in a set that can hold a cache line it resides. Typically, the size of such ADDR address tags is fairly large and can be in the range 30-40 bits, which is 6-10% the size of a typical cache line.

Often, each cache has built-in strategies to determine which cache line to keep in the set and which cache line to evict (also referred to as replace) to make space for a new cache line being brought into the set, referred to as its replacement policy. The replaced cache line is known as a victim or a replaced cache line. Popular replacement policies used in conjunction with cache memories include, but are not limited to, least-recently used (LRU), pseudo-LRU and random replacement policies.

Inclusive cache hierarchies require that a copy of a block of data (for example a cache line) present in one cache level, for example a block of data in the L1 cache, also exists in the higher cache levels (here, higher refers to cache levels with higher numbers than 1), for example in the L2 and L3 cache. Exclusive cache hierarchies only have one copy of the block of data (for example a cache line) existing in the entire cache hierarchy, while non-inclusive hierarchies can have a mixture of both strategies. In exclusive and non-inclusive cache hierarchies, it is common that a cache line is installed in the next higher cache level upon eviction from a given cache level.

With this background on caches and cache lines in mind, this discussion now proceeds to illustrate one conventional technique for identifying specific cache locations within a cache hierarchy like that shown in FIGS. 1 and 2. FIG. 3 is a block diagram for explaining a conventional implementation of a two-level cache hierarchy including a set-associative caches and a set-associative data translation look-aside buffer (TLB). FIG. 3 shows an example of the organization of a computer system node containing a CPU 301, a DTLB 303, an L1 CACHE 307 and an L2 CACHE 311. The CPU 301 generates a memory request containing a virtual address 302 (VADDR), which is used to perform an associative lookup in the DTLB 303. The virtual address 302 is in this example divided into three parts: P-OFFSET (page offset, for example consisting of the low-level bits), TAG and INDEX. The INDEX portion of the virtual address 302 is used to identify the set within the DTLB 303 where the address translation may be stored.

The illustrated DTLB 303 used in this example has a two-way associative organization, showing two entries of the identified set. Each entry consists of an address tag (ATAG) 304, and physical page frame (PPF) 305. The TAG portion of the virtual address 302 is compared with the ATAGs 304 of each entry of the identified set. The logic 318 determines if there is match for any of the entries, and, if so, controls the MUX 306 to select the corresponding PPF 305. A physical address PADDR 316 is composed by concatenating the PPF 305 selected by MUX 306 with the P-OFFSET portion of the virtual address 302. Alternatively, if neither of the entries of the identified set match the TAG portion of the virtual address 302, then a TLB fill operation is performed and the needed translation entry is brought into the DTLB 303.

The PADDR 316 is used to perform a lookup in the L1 CACHE 307. More specifically, an INDEX portion of the PADDR 316 is used to identify the set where the cache line containing the requested data may be stored. (It should be noted that this L1 INDEX may contain different bits than the DTLB INDEX). The depicted L1 CACHE 307 has a 2-way associative organization with two entries in the identified set. Each entry consists of an address tag (ATAG) 308, and data 309 of the corresponding cache line. A TAG portion of the PADDR 316 is compared with the ATAGs of each entry of the identified set. The logic 319 determines if there is match for any of the entries, and controls the MUX 310 to select the corresponding data. If neither of the entries matches (depicted by L1 MISS 317) a lookup in the L2 CACHE 311 is needed. While the division of PADDR 316 into INDEX and TAG portions for the L2 CACHE lookup may differ from the division done for the L1 CACHE lookup, the remaining steps for the L2 CACHE lookup are typically similar to those performed for the lookup in the L1 CACHE. If a miss in the L2 CACHE is determined, new lookups in higher-level caches or accesses to memory may be needed. It can be noted that if the INDEX portion of PADDR 316 used by the L1 cache is entirely composed by P_OFFSET bits, the access to the L1 cache 307 can be started before the PPF information coming from the MUX 306 is available. This is often referred to as a virtually indexed, physically tagged cache (VIPT).

It would be appreciated by someone skilled in the art that several "nodes", each with a memory hierarchy similar to the one depicted in FIG. 3, can be connected together to form a coherent multiprocessor system. Another example of a multiprocessor is shown in FIG. 1, where each CPU has its own private L1 cache. This further complicates the task of locating where a requested data resides since it is no longer sufficient to always search for the data in the next higher cache level. Mechanisms for searching caches of the other nodes as well as for keeping the multiple copies of a datum stored in different nodes coherent are needed.

As further background information, FIG. 4 is a block diagram illustrating an example implementation of a tag-less cache. Such caches rely on location information (LI), which is sometimes referred to as cache line pointers CP, corresponding to a requested cache line of a matching cache table entry (CTE) (sometimes referred to as a region location) to indicate in which cache, as well as in which location within that cache, the requested cache line resides. This will cause computer systems to perform a direct cache lookup at the appropriate cache. The example implementation of the tag-less cache illustrated in FIG. 4 includes a two-level cache hierarchy and a two-level cache location buffer (CLB) hierarchy, where the first level is virtually accessed and the second level is physically accessed.

For example, in the system (which may be a node in a multiprocessor system) shown in FIG. 4, the location information can distinguish between L1 CACHE and L2 CACHE. It may also be able to distinguish between other caches present in the rest of the multiprocessor system, not shown in this Figure. FIG. 4 shows a tag-less node, that may be connected to other nodes in a multiprocessor system, with a two-level cache hierarchy of set-associative caches and a CPU (which may contain one or many traditional caches, here depicted L0), where CPU 401 generates addresses (ADDR) 402. FIG. 4 also shows a two-level CLB hierarchy of set-associative CLBs, where first-level CLB CLB1 410 and second-level CLB CLB2 420 are indexed with ADDR. As used in the present disclosure, the term "CLB1" may refer to a first-level CLB and the term "CLB2" may refer to a second-level CLB. Each entry in CLB1 410 includes at least an address tag (AT) 411 and a cache location table (CLT) 412. It may store additional information, such as region information (RI) 413. The CLT 412 stores location information (LI) for the cache lines of a corresponding region (also referred to as a micropage). FIG. 4 shows four LI per region as an example. Empirical studies by the inventors shown that 8 to 16 LI per region (i.e., 8 to 16 data units (cache lines) per region) to be cost-effective and efficient. The location information encodes the location where the corresponding cache line can be found within a multiprocessor system. The location information may, for example, contain the identity of a cache where the data unit can be found. The location information may also contain a location within that cache where the data unit can be found. Alternatively, the location information may contain the identity of a node where the data unit can be found or contain some symbol that provides information about its location, for example the symbol "MEM" indicates that the data unit can be found in memory. In at least some cases, the symbol "don't know" may indicate that the location of the corresponding data unit is not recorded in the CLT corresponding to the region. MUX 416 selects the CLT with an AT 411 matching a TAG portion of the ADDR 402 and a MUX 415 selects the LI 414 corresponding to the requested cache line based on the LI-OFFSET portion of ADDR 402. If the cache identity stored in the selected LI corresponds to the L2 cache 440, an address 417 for accessing the requested data unit in L2 CACHE 440 is formed using an INDEX portion of the address 402 and a portion of the location information 414. In the example of a set-associative L2 CACHE 440, that portion contains information corresponding to the associative way where the requested data unit is stored. If the cache identity stored in the selected LI corresponds to the L1 cache 430, an address 418 for accessing the requested data unit in L1 CACHE 430 is formed in a similar way.

For a cache hierarchy consisting of set-associative cache with the same associativity, the number of bits in each LI is dependent on the number of ways and number of caches of the cache hierarchy covered by the CLB. One LI value can be reserved for an invalid pattern ("MEM"). In this implementation, the number of LI bit(s) is equal to the log base 2 of the number of way(s) plus the log base 2 of the number of cache levels covered by the CLB plus one (i.e., log 2(way)+log 2(levels)+1). If the number of ways of the different cache levels varies, or if caches other than set-associative caches are used, those skilled in the art will appreciate that other LI representations are possible. Typically, the size of LI is much smaller than the size of a typical address tag. A 2-level cache hierarchy with 16-way associative caches at each level can be encoded using 6 LI bits.

In the example illustrated in FIG. 4, each entry in the L1 cache 430 and L2 cache 440 have a backwards pointer (BP), 432 and 442 respectively, associated with its cache line. (DATA), 431 and 441 respectively. In this example, the BP pointers point to their respective associated CTE in CLB2 420. Each CTE in CLB2 420 contains an address tag (AT) 421, a CLT 422 and a CLB1 Pointer (CIP) 423. If the CLB2 entry has a corresponding CLT residing the CLB1 410, its CIP will point to that entry. In that case CLB1 410 will contain the up-to-date information for this region. In that case, the CLE in CLB1 is said to be the active CLB entry, while the CLB entry for the region in CLB2 420 contains a passive entry. CLB2 420 may be required to contain a passive entry for a region if CLB1 410 contains an active entry for the region.

According to at least one example embodiment of the inventive concepts, when no matching CTE can be found in CLB1 410, a corresponding CTE is looked for in CLB2 420 and copied to CLB1, while an old entry in CLB1 is copied to CLB2 420, this is referred to as spill and fill or simply spill/fill (SPILL and FILL in FIG. 4). A spill is also for example performed when a traditional inclusive cache evicts a data unit to the next level to make space for a new data unit, which may be brought in (fill) from the next cache level. A similar spill/fill activity will be performed between the different CLB levels, where CLB entries are moved between the CLB levels, since the CLB levels forms an inclusive hierarchy. A directory DIR may be at the root of the CLB hierarchy and spill/fill with the highest level CLBs.

It is possible to initiate access to the requested data unit in parallel with the spill/fill activity.

The contents of the CLBs of a multi-level CLB implementation may be kept consistent with the locations of the data units of the multi-level cache system they manage. A data unit that is moved in the cache hierarchy, including but not limited to movements caused by requests for the data unit from the CPU, evictions of the data unit, prefetching activities and coherence activities, cause an update to its corresponding location information in one or many of the CLBs. For example, in FIG. 4, evicting a data unit 441 from cache 440 can involve the steps of following its associated BP 442 pointer to find its corresponding CTE (which in this example is in the CLB2 420) and updating its corresponding location information to point to the data unit's new location (e.g., storing the MEM symbol). And, if the CIP pointer of the corresponding CLB2's CLE is valid, following the CIP to find its corresponding CTE in the CLB1 410 and updating its location information associated with the cache line. According to at least one example embodiment of the inventive concepts, the entry in the CLB2 is not updated if there is a valid CIP pointer. For example, CLTs may be updates such that only active CLTs are updated.

As will be appreciated from the foregoing, using the above-referenced tag-less cache systems, i.e., cache systems where the data unit stored in a cache does not have an address tag associated with it, will result in a number of different types of transactions which will occur when various cache lines located in different storage devices are requested by a CPU 401. The node depicted in FIG. 4 may be a subsystem (or node) of a larger multiprocessor system comprised from several such cache nodes. Keeping the data of the caches in the many nodes coherent requires a cache coherence protocol, for example implementing either snooping or directory-based coherence. The coherence protocol will send coherence requests to the depicted node in FIG. 4 (EXTERNAL REQUESTS). These requests will typically first turn to CLB2 420, which may determine that this cache system does not have the requested cache line (CLB2 miss or a CLB2 hit to an entry with an inactive CIP and the location information of the requested cache line holding the value memory pattern). If so, no further action is needed with respect to the data caches L1 and L2 (known as coherence filtering), but the corresponding LI in the active CLT may nevertheless need to be updated to track a new location associated with the data unit. Otherwise, the CLB2 lookup may provide the requested location information (CLB2 hit and the location information of the requested cache line holding storing the location of the cache line), or it may determine that CLB1 410 stores the associated location information (CLB2 hit and a valid CIP). In the latter case, a lookup in CLB1 410 is needed to determine either the location of the requested cache line or that the cache line does not reside in this cache sub-system. (The corresponding location information in CLB1 contains a memory pattern). Depending on the nature of the coherence request, for example an invalidation request, a read request, or an exclusive read request, the coherence protocol will perform some operations on the requested data unit and possibly change its state. The corresponding LI in the active CLT may also need to be updated to track a new location associated with the data unit.

Even though the node shown in FIG. 4 consists of two cache levels, someone skilled in the art would understand that nodes can be assembled using other number of levels and may contain more than one CPU. Furthermore, the number of cache levels and the number of CLB levels in a node do not need to be identical.

FIG. 5 is a block diagram illustrating a portion of a computer system including two CPUs connected to a two-level cache hierarchy and a two-level cache location buffer (CLB) hierarchy. For example, the computer system in FIG. 5 includes two CPU nodes (580 and 590), each within their own one-level cache hierarchy with one CLB (CLB1A 503 and CLB1B 513) and a private cache L1 CACHE (504 and 514). The system also contains a global shared L2 CACHE 523 (sometimes referred to as a last-level cache LLC), which is shared between the two CPUs 501, 511.

A lookup in a CLB1 (513 or 503) selects a single LI based on an address generated by their respective CPUs (501, 511), for example using techniques similar to CLB1 410. As indicated by the three arrows initiated by the two shown CLT entries in CLB1A 503 and CLB 513, the selected LI may identify the location to be either in the corresponding L1 cache (504 and 514 respectively), in the L2 cache 523 or in the other node (showed by 570 and 571 respectively). In this example, CLB1A 503 identified its accessed data to be 505 in the shared L2 cache 523, while CLB1A 503 identified its accessed data to be 505 in its L1 514 (show by the solid arrows).

FIG. 6 is a block diagram illustrating a portion of a computer system including a tag-less cache hierarchy with a single monolithic last level cache. Turning to FIG. 6, FIG. 6 shows a generalized depiction of a tag-less multiprocessor memory system. This example consists of N nodes, ranging from Node-1 601 to Node-N 699. Each node has X levels of CLBs and Y levels of private caches, i.e., caches private to the node. The nodes are connected together with each other through a network on chip (NoC) 650 circuit. NoC 650 also connects the nodes to the directory (DIR) 660, the global last level cache (LLC) 670 and memory 680. DIR 660 is organized similarly to CLBs and has entries that consist of at least an address tag (AT) 661 and a cache location table (CLT) 662. An entry may also contain additional information, such as region information (RI) 663, which is described in more detail below. The highest level CLBs in the nodes (CLB-X 630, 693) spill/fill to/from DIR. DIR also plays a central role in the coherence protocol that keep the contents of the caches and the CLBs coherent and consistent.

The CLBs and DIR can be viewed to form one inclusive "cache hierarchy", caching metadata with information about the content of the data cache hierarchy. The data hierarchy, containing L-1s through L-Ys and the LLC can be viewed as a separate cache hierarchy with no inclusion properties imposed upon it. It may for example by non-inclusive, inclusive or exclusive.

In the example shown in FIG. 6, each node has one CPU (CPU-1 600, CPU-2 696), possibly containing zero, one or many traditional tag-based caches, depicted L0-D and L0-I. Memory requests that cannot be satisfied by any of the traditional L0 caches will generate a lookup in the node's CLB-1 (e.g. 610) in search for a corresponding CLB entry CLT, possibly using a scheme similar to CLB-1 410 in FIG. 4. If a corresponding entry is found in CLB-1, the location information (LI) corresponding to the requested data unit can be located in its CLT field (612). The LI identifies a location where the requested data unit can be found. LI residing in the CLB-1 610 in Node-1 601 may identify either one of the node's own caches (L-1 620 through L-Y 640), the LLC (670), the memory 680, or any of the other nodes (Node-2 690 through Node-N 699) as a location for the data unit it is tracking. The LI may also identify the data unit's location within an identified cache. The LI may also indicate if a data unit resides in any of the traditional caches L0-D or L0-I of a CPU 600 connected to the node.

If a cache location (or memory) is identified as a location where the data can be found, the request can be satisfied by reading that cache directly without consulting a directory (DIR) 660. If a node is identified as the location where the requested data can be found, a request is sent to the CLB-X of that node and the request satisfied similarly to the EXTERNAL REQUESTS discussed for FIG. 4. Still, the directory does not need to be consulted in order to find the data. This is different from most traditional directory-based coherence schemes, where the directory is consulted and updated for accesses that go outside of a node.

Even though FIG. 6 shows one CPU in each node, someone skilled in the art would realize that a node may contain any number (including zero) of CPUs, GPUs, accelerators or other devices that may access memory, such as I/O devices. Furthermore, the configuration and size of CLBs and caches may differ widely between the nodes.

According to at least one example embodiment of the inventive concepts, there is a strict hierarchical search level-by-level in the inclusive CLB/DIR hierarchy. If the location information is not found at a level CLB-i, a lookup is performed at the next level CLB-(i+1). If the location information cannot be found in the node's highest level (CLB-X), a lookup is performed in DIR. If location information is found at a CLB level or in DIR, a read request can be sent to the data location identified by its corresponding location information at that level and a new CLE entry corresponding to the requested region is created in CLB-1. The CLB/DIR hierarchy is inclusive. This implies that if there is an CLB entry available at level CLB-L, there has to be an entry installed at level CLB-(L+1). The CLB entry closest to the CPU is active. There may be inclusion enforced between cache level K (as well as lower cache, i.e., higher up in FIG. 6) and a certain CLB level C (as well as all higher CLB levels, i.e., further down in FIG. 6. As an example, in order for data to be available in any of the caches L-1 620 through L-Y 640, there has to be a corresponding entry in CLB-X 630. If that entry in CLB-X 630 is evicted, all data of the corresponding region should be evicted from caches L-1 620 through L-Y 640. This is referred to as forced eviction. Furthermore, all CLB entries of the same node down to CLB-1 610 also need to be evicted.

It should be noted that there is no inclusion requirement between the cache levels within a node (e.g., caches L-1 620 through L-Y 640) or between LLC 670 and cache in a node (e.g., caches L-1 620 through L-Y 640). For example, valid data corresponding to a specific address may exist in the L1 cache 620, but not in neither cache L-Y 640 nor in the LLC cache 670. This opens up for cache bypass optimizations, where for example streaming data only need to be installed in L1 cache 620 (actually, only in L0 if it exists) and at no other levels. However, the corresponding CLB entries (which typically is 50 times smaller its corresponding data region) need to be installed at all levels.

The directory (DIR) 660 contains CLB-like information: address tag (AT) 661, Cache Location Table (CLT) 662 and Region Information (RI) 663. While these fields have the same name as the fields of CLBs (e.g., CLB-X 630), the contents of these fields may differ from the corresponding CLB fields. The RI field 663 of DIR 660 may contain N so-called presence bits (PB), indicating which nodes are tracking the region, where N corresponds to the number of nodes in the system. If bit K in the PB is set it implies that there is a corresponding entry in CLB-X of node K. This further implies that there may be cached data in any of the cache levels L-1 through L-Y of node K and also that there may be a corresponding entry in CLB-1 in node K, which would enable the CPU in node K to access any cache line of the corresponding region. While the description refers to an N-bit implementation of the PB information, someone skilled in the art would realize that many scalable techniques used for directory implementation, including but not limited to coarse-grained, limited pointers and linked lists, can be used to implement a similar functionality.

The PB bits can be used to classify regions. A region is classified as a private region (PR) if exactly one of the PB bits of the corresponding entry in the directory 660 is set. Empirical studies show that about 80% on average of all accessed regions are PR regions across a wide selection of studied benchmarks. The region classification PR implies that data of the region may exist only in the one node with its corresponding PB bit set and also guarantees that no other node can access data from the region at this point in time. A Node-1 601 with its PB bit being the only set bit in DIR may be notified that the corresponding region is a private region (PR) and may record the regions classification in its corresponding region information (RI) in its CLB (e.g. in CLB-1 610 through CLB-X 630). PR regions may be accessed efficiently in many respects. For example, no global coherence is needed for the node to gain write permission for a data unit present in the node for which the node currently only has read permission (to upgrade the data unit from state S to state E), since only one node may have caches copies of its data and no other node can access any of the data units of the region. Also movements of data units of a PR region may be implemented efficiently, since data can be moved up and down the entire cache hierarchy (e.g., performing an eviction from L-X to LLC or moving data from LLC to L-1) without the need to inform any structures outside the node. The movement also needs to be recorded in a CLB local to the node (610 through 630). This implies that the CLT information of a PR region stored in the CLBs of the node (610 through 630) may differ (e.g., be more up-to-date) than the CLT information of the region stored in DIR 660.

When a second node (e.g., 690) accesses a PR region (empirical studies show that this is a relatively rare event), it will miss in all its CLBs 691 through 693 and will send a request to DIR 660 to get the appropriate location information LI needed to access the data and also to allow for creations of its own CLB entries in CLB 691 through 693. Since this request is for a PR region, DIR 660 may not have up-to-date information, it needs to get up-to-date location information from Node-1 601 and make sure that CLBs of Node-1 601 no longer marks the region as PR, update its own CLT information for the region, set the PB bit corresponding to Node-2 690 and send appropriate CLB information for the region to Node-2 690. Node-2 690 can now create its own local CLB entries associated with the region. Node-1 601 may have to complete all its ongoing direct-to-data memory requests for the region before sending up-to-date location information to DIR 660.

If yet another node (e.g., Node-N 699) accesses the region, it will also miss in all its CLBs and will also send a request to DIR 660, which now has up-to-date information about the region and can reply with the appropriate information to Node-N 699 and also will set the PB bit of the region for the requesting node (i.e., Node-N 699).

Regions with more than one PB bit set are classified as shared regions (SR). This implies that more than one node has CLBs tracking the location information for this region. It also implies that the nodes with corresponding PB bits set may store data units of the region in any of their caches (e.g., 620 through 640). A request from a CPU (e.g., 600) to access a data unit, which cannot be satisfied locally within the node (e.g., by caches L-1 620 through L-Y 640), may need to initiate a global coherence transaction if the region is classified as SR.

A global coherent read transaction to an SR or PR region (a read which cannot be satisfied from a local cache (e.g., caches L-1 620 through L-Y 640)) may utilize the location information retrieved from its local CLBs (e.g., CLB-1 610 through CLB-X 630) to access the data directly without involving the DIR 660 or communicating with any nodes other than the node that may be identified by the location information. This is referred to herein as a direct-to-master access. Empirical studies show that 75% of all global coherent transactions to SR regions are direct-to-master read transaction accesses. So, if 20% of the global transactions initiated by CPUs are to SR pages and 75% of those do not need to access DIR, then 95% of the global coherence transactions do not need to access DIR when using at least some of the above-referenced cache structures and techniques, whereas all global coherent transactions need to access DIR for traditional directory-based protocols.

Since SR regions have several nodes tracking the location of its data units, their data unit movements need to be reflected in all nodes tracking the region (i.e., those nodes having an active CLB entry for the region) and the location information of the moved data units is updated in those nodes. The location information of CLBs of different nodes tracking the data unit should be updated in a coherent manner such that the CLBs agree about where the data resides (referred to as the master location). It may also be highly likely or, alternatively, guaranteed that a data unit location accessed based on location information retrieved from a CLB contains the correct data (referred to as determinism).

One common reason for such data unit movements is global coherent write requests, i.e., a requesting node that currently does not have write permission to a data unit requests write permission through a global coherent request, for example an invalidation request or an exclusive read request. After the request has completed, the data unit will only reside in the requesting node.

Global coherent write requests may be sent by a requesting node (e.g., 601) to the directory 660, which locates the corresponding directory entry, retrieves the corresponding PB bits for the region and forwards a request to all nodes (except the requesting node) which have a corresponding PB bit set, which nodes are referred to as the slave nodes (for example nodes 690 and 699). The slave nodes send ACK messages when they have made sure that any future requests for the data unit originating in the slave node will be directed to the requesting node. This can for example be achieved by changing their location information for the data unit in their CLBs to point to the requesting node (601), which will become the new master node. The ACK messages can either be sent to the DIR 660, which aggregates them and sends an ACK to the requesting node once all ACKs have been received, or sent directly to the requesting node 601. Once the requesting node knows that all ACKs have been received, it has acquired exclusive write permission for the cache line and completes the request. A completion message may be sent to the DIR 660 upon the completion of the request.

Another common reason for data movement is evictions (also called replacements). Evictions local to a node, for example eviction from L-1 620 to L-Y 640 are handled locally, tracked by its local CLB entries and are not visible outside the node. However, a global eviction of a master data unit, for example from location 641 in L-Y 640 to a new location 671 in LLC 670 must be reflected by all nodes tracking the region (i.e., all nodes with CLB entries for the region). Global eviction may be implemented by first copying the value of the data unit stored in its old location (641) to the new location (671), while keeping the data stored in the old location (641) valid. Then, a global coherent eviction request, with information about the new location (671), is sent from the requesting node (e.g., 601) to DIR (660), which forwards a request to the slave nodes (e.g., 690 and 699). Once the slave nodes have updated their corresponding location information to the new location (671) they send an ACK message. Once the requesting node knows that all ACKs have been sent, it has acquired eviction permission for the data unit and can reclaim the old location and the request is completed. A completion message may be sent to DIR 660 upon the completion of the request.

A slave node may not send ACK messages until some its outstanding requests (for example all direct-to-master requests) for the requested cache line have been completed.

The directory 660 may implement a blocking mechanism that ensures that there can be at most one outstanding global request of certain types for each data unit. Examples of such request types could be global coherent write requests and global coherent eviction requests. The blocking for a cache line ends after the request has been completed, or as otherwise specified by the coherence protocol. The blocking mechanism can be exact, for example implemented by one lock per data unit in the directory, or could be an over-approximation, where addresses hash to a limited pool of locks and that the blocking of a data unit will block accesses for all other data units hashing to the same lock.

The blocking may be done with a region granularity, instead of a data unit granularity, and some of the CLB/directory spill/fill requests also need to block until their updates have been completed. This guarantees that no global coherent write requests are in progress while the nodes and directory spill/fill CLB information.

Another useful region classification is a region with no PB bits associated with the region being set in DIR 660. This implies that the regions data units cannot be present in any of the node's caches L-1 though L-Y and that none of the nodes currently can access its data units. This is referred to as an untracked region (UR). Data of UR regions may still be cached in the LLC. Data units of UR regions can be evicted from LLC 670 without any global coherence requests. A region with no corresponding entry in DIR 660 is classified as a memory region (MR). Data units of MR regions cannot be cached in neither the nodes nor in the LLC. Replacing a CLT entry from DIR 660 implies that all data unites of that region should be forcefully evicted from the LLC.

The cache system of FIG. 6 may be a tag-less cache system, i.e., a cache system where a data unit stored in a cache (for example the caches L-1 through L-Y of the nodes and the LLC) not have an address tag associated with it. Instead, a location information with an address tag associated with it will identify the location where the data unit is stored. The traditional caches included in FIG. 6 (L0-I and L0-D), may still have address tags associated with their cache data units though.

FIG. 7 is a block diagram illustrating a generalized tag-less cache hierarchy with many slices of last level cache. FIG. 7 differs from FIG. 6 in that the LLC has been cut up into LLC slices (, LLC-2 772 and LLC-N 779) and placed on a side of the network on chip (NoC) 750 close to the nodes. Each of the slices is configured with a replacement counter (RC) 775, 776 and 777 respectively. These counters count the number of cache replacements in each LLC slice. It should be noted that the example illustrated in FIG. 7 places the LLC slices outside of each node (represented by the dashed boxes). Even though each LLC slice (e.g., 771) is adjacent to each node and can be accessed with a very short latency from the node's CPU (700), they can still be regarded as a piece of the large global LLC. Evicting a region entry from a CLB-X (e.g., 730) does not necessarily require the corresponding region data residing in the LLC slice close to the node (e.g., 771) to be forcefully evicted. Further, a node (e.g., 701) may store location information in its CLB (e.g., 710) pointing straight to a location in a remote LLC slice adjacent to a remote node (e.g., a location in 772) and may access that data without the need for indirections through neither DIR 760 nor any of the CLBs of that node (790).

There exist LLC implementations today that are reminiscent of FIG. 7 (only in the sense that the LLC is physically divided into banks that are physically placed close to the nodes and not with respect to other elements of FIG. 7). However, solutions today (for example server chips from Intel) place data units in LLC banks according to their address, which results in that 25% of the accesses hitting in an LLC bank will hit in the bank close to the node, assuming four nodes. The cache access technique described according to at least some of the examples discussed above, e.g., based on location information pointers, allows full flexibility for placement of the data units and does not depend on the address of a data unit, which potentially could increase the local portion of the LLC hits. One option would be to replicate all the shared data in all the LLC slices where it is accessed. However, replicating all shared data in all LLC slices will consume LLC capacity. As stated before, 20% of regions are typically shared. Assuming that all shared regions will need to be replicated in all nodes, a four-node system would use up 80% of its LLC capacity storing replicated LLC data. This may be sub-optimal, prompting for the need for smarter LLC allocation/replication decisions.

When a data unit is first allocated to an LLC slice, it may appear beneficial to always put it in the LLC slice adjacent to the CPU accessing it. However, since the threads running in the different CPUs may have different LLC capacity requirements, it may sometimes be beneficial to place the data unit in a remote LLC slice and thus "steal" some of its local LLC capacity. In at least one example, the allocation decision is made based on LLC slice cache pressure. Each LLC slice has a replacement counter (RC 775, 776, 777) registering the number of replacements taking place in the slice. In at least one example, these counters are monitored periodically to determine the cache pressure for each LLC slice, where a higher count indicates a higher pressure. When allocating an LLC space for a data unit, space is always allocated in the local LLC slice if its cache pressure is the lowest. If not, a configurable fraction of its allocations will be made to the remote LLC slice that currently has the lowest pressure, while the remaining allocations are made in the local LLC slice. In at least one example, allocation of space in remote LLC slices will only occur under certain circumstances, e.g., if the cache pressure of the local LLC slice is above a certain threshold.

In a traditional cache topology, where a single last-level cache is shared by several nodes, such as L2 103 in FIG. 1 or LLC 670 of FIG. 6, there is typically at most one copy of each data unit residing in the LLC (referred to as a shared cache) while caches that are private to a node (also referred to as a private cache), such as the L1 caches 102 of FIG. 1, may each store replicated copies of the same data unit. The LLC slices of FIG. 7 have the option of either storing a single copy of a data unit in one of the LLC slices and have all nodes access using identical location information, or storing several so-called replicated copies of a data unit in several LLC slices.

For example a data unit 774 may be the only LLC copy for a data unit and both CLT 712 in CLB-1 710 and a CLT in CLB-1 791 have their associated location information pointing to location 774. This is referred to herein as shared LLC data. After a decision has been made to replicate the data, a copy of the data can be put in location 773 and the associated location information in CLT 712 changed to point to location 773. The data unit stored in 773 is referred to as a local LLC data unit. The local data stored in location 773 can only be accessed indirectly through a lookup in a CLB local to Node 1 701, while the global data stored in location 774 can still be accessed directly by, for example Node N 799, by using location information pointing to location 774.

In at least one example, the cache system of FIG. 7 is a tag-less cache system, i.e., a cache system where a data unit stored in a cache (for example the caches L-1 through L-Y of the nodes and the LLC) not have an address tag associated with it. Instead, a location information with an address tag associated with it will identify the location where the data unit is stored. The traditional caches included in FIG. 7 (L0-I and L0-D), may still have address tags associated with their cache data units though.

To summarize the discussion associated with FIG. 3-7, it will be appreciated by those skilled in the art that contemporary implementations of a cache hierarchy may require many costly operations upon, and movements of, data units. The cost for some of these operations depends on which operations have been applied to the data unit previously, e.g., a read request to a data unit will lower the cost for a subsequent write operation to the data unit if the data unit is brought into the L1 cache in a writable state. Also the cost of data movements depend placement decisions made by previous operations.

Accordingly, it would be desirable to provide systems and methods that predict future operations and enable for more optimal choices to be made for the current operations.

SUMMARY

According to at least one example embodiment of the inventive concepts, data units are classified as belonging to a dataset and are assumed to have a similar behavior to other data units of the same data set. The current behavior for a dataset is recorded by counting how many times certain events occur for data units belonging to the dataset. The dataset is predicted to have a similar behavior in the future, which prompts certain modifications or, alternatively, optimizations to be applied for future operations to the dataset. One such modification or, alternatively, optimization includes future per-dataset placement decision for a two-dimensional non-uniform cache architecture (NUCA) array. At least some example embodiments of the inventive concepts also include a generalized method to predict a wide variety of behavior per dataset, for which known modifications or, alternatively, optimizations exist and can be applied.

According to at least some example embodiments of the inventive concepts, a data management method for a processor to which a first cache, a second cache, and a behavior history table are allocated, includes tracking reuse information learning cache lines stored in at least one of the first cache and the second cache; recording the reuse information in the behavior history table; and determining a placement policy with respect to future operations that are to be performed on a plurality of cache lines stored in the first cache and the second cache, based on the reuse information in the behavior history table.

According to at least some example embodiments of the inventive concepts, a multi-processor system includes a first cache and a second cache having different cache levels with respect to each other; and at least one processor core configured to determine a placement policy with respect to future operations that are to be performed on a plurality of cache lines stored in the first cache and the second cache, based on reuse information recorded in a behavior history table, wherein the reuse information is information about reuse of learning cache lines stored in at least one of the first cache and the second cache.

According to at least some example embodiments of the inventive concepts, a non-transitory computer-readable storage medium includes instructions that, when executed by a processor to which a first cache, a second cache, and a behavior history table are allocated, cause the processor to perform operations including, tracking reuse information learning cache lines stored in at least one of the first cache and the second cache; recording the reuse information in the behavior history table; and determining a placement policy with respect to future operations that are to be performed on a plurality of cache lines stored in the first cache and the second cache, based on the reuse information in the behavior history table.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
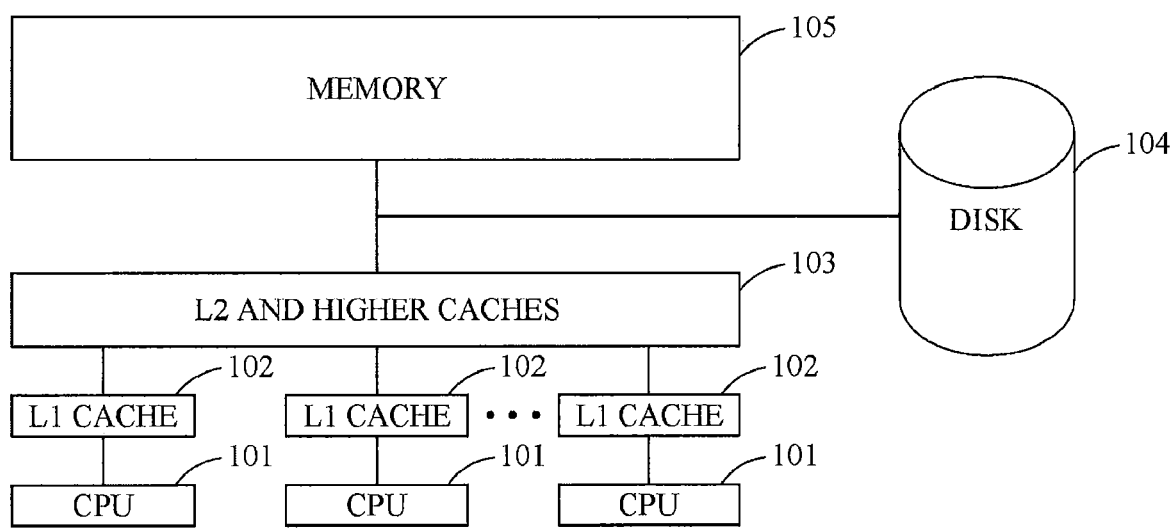
FIG. 1 is a block diagram illustrating a portion of a computer system.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

During an execution of an application, many costly operations upon, and movements of, data units are performed. The cost for some of these operations depends on which operations have been applied to the data unit previously, e.g., a read request to a data unit will lower the cost for a subsequent write operation to the data unit if the data unit is brought into the L1 cache in a writable state. Furthermore, operations applied to private regions can be handled more desirably or, alternatively, optimally if it is known that the region is likely to stay private in the future. Also the cost of data movements depends upon placement decisions made by previous operations. For example, if data likely to be reused is placed in a faster cache than data that are less likely to be reused, future operations are more likely to find a requested data in the fast cache. Accordingly, it would be desirable to provide systems and methods that predict future operations and enable more desirable or, alternatively, optimal choices to be made for the current operations.

According to at least some example embodiments of the inventive concepts, a Future Behavior Prediction (FBP) mechanism can be used to predict such future operations. According to at least one example embodiment of the inventive concepts, FBP is built from a combination of some or all of these 5 components:

1. Identifying dataset: The behavior may be tracked for each individual cache line. Another alternative is to track the behavior for a group of cache lines that are believed to have a similar behavior, here referred to as a dataset. According to at least one example embodiment of the inventive concepts, data units located close to each other in the address space are determined to belong to the same dataset. For example, according to at least some example embodiments, the address space may be divided into N different groups of contiguous addresses. Further, the N groups of addresses may correspond, respectively, to N datasets such that data units having addresses included in a particular group, from among the N groups of addresses, are considered to belong to the data set, from among the N datasets, to which the particular group corresponds. According to at least one example embodiment of the inventive concepts, each dataset may be identified by assistance from the programmer, the compiler and/or a runtime system. According to at least one example embodiment of the inventive concepts, the Program Counter (PC) value (i.e., the value or instruction address stored in the PC) identifying the instruction that brings a cache line into the cache hierarchy from memory, or from a cache level higher than a specific FBP level threshold, is used to identify the dataset it belongs to. According to at least another example embodiment of the inventive concepts, the PC value that caused a TLB fault for the page where the data resides is used to identify the dataset of that page. According to at least another example embodiment of the inventive concepts, the PC value that caused a CLB miss at a certain CLB level for a region where the data resides is used to identify the dataset of that region. According to at least another example embodiment of the inventive concepts, the PC value of an instruction that generated at least one of the "cache line requests" that initiated a hardware prefetch stream to start is used to identify the dataset. According to at least another example embodiment of the inventive concepts, call stack information (for example, the identity of the PC values of the last functions calls) is used to identify the dataset. According to at least one example embodiment of the inventive concepts, two or more of the above schemes are combined for identifying a dataset. Those skilled in the art will realize that, in order to save storage space, both the call stack and the PC value may be represented by some subset of their address bits or by some other transformation function using their address bits as an input. According to at least one example embodiment of the inventive concepts, the dataset is identified by a dataset identifier (DID). According to at least one example embodiment of the inventive concepts, the DID is composed by, at least in part, some bits from a CP, some call stack information and/or some address bits of an address range.

2. Detecting special usage: One or many types of special usages to a cache line may be detected and recorded. For example, according to at least one example embodiment of the inventive concepts, the number of special usages of a certain type (e.g., read accesses) to the cache line or a dataset is tracked and recorded by a counter counting the number of times that special usage occurs to a cache line or dataset. Every type of cache line usage possible may be recorded as a special usage. Types of such special usage to be tracked and recorded include, but are not limited to, read accesses, write accesses, cache allocations, cache evictions, cache eviction of a cache line that has never been reused, conversion of a region from private region to shared region, conversion of a cache line which is only readable to become writeable, the number of cache lines currently residing in the cache hierarchy, or the number of regions or pages currently residing in the cache hierarchy. According to at least one example embodiment of the inventive concepts, the reuse information consists of a single reuse bit that records if a cache line, region or page has been accessed at all after its initial installation (or, storage) at a specific level. According to at least one example embodiment of the inventive concepts, the reuse for a cache line at a specific cache level is determined by looking at the cache line's reuse information when the cache line is replaced. Someone skilled in the art understands that many more special usage types are possible to track and record and that enumerating a complete list is unnecessary. According to at least one example embodiment of the inventive concepts, some special usages of cache lines are recorded per core while other special usages are recorded for the entire system. Modern computers are often equipped with a multitude of event counters capable of counting a large number of different hardware events. All such events could also be recorded by the described mechanism.

3. Selective learning: Sometimes, recording every special usage for all cache lines could be too costly. According to at least one example embodiment of the inventive concepts, so-called learning cache lines are selected and special usage (s) are only collected for these cache lines. According to at least one example embodiment of the inventive concepts, learning cache lines are selected randomly. According to at least one example embodiment of the inventive concepts, only cache lines belonging to certain pages, regions or other type of address ranges (which may be referred to as learning pages, learning regions or learning address ranges) are learning cache lines. According to at least one example embodiment of the inventive concepts, each such learning page, region or address range is selected randomly. According to at least one example embodiment of the inventive concepts, each such page, region or address range is marked as a learning address range or as a learning cache line. The learning cache lines may also be selected based on which dataset (DID) they belong to. According to at least one example embodiment of the inventive concepts, all cache lines are learning cache lines. One could also combine several of the selection methods described above.

According to at least one example embodiment of the inventive concepts, learning cache lines are operated upon in a special way. For example, a learning cache line may be installed in all cache levels, while the rest of the cache lines will be installed only in the levels identified by a certain placement policy, e.g., a placement policy associated with their DID. According to at least one example embodiment of the inventive concepts, special usage is only detected, as described above in "2. Detecting special usage", for learning cache lines.

4. Recording special reuse: When a special usage to a learning cache line is detected, this detection is recorded in a Behavior History Table (BHT). According to at least one example embodiment of the inventive concepts, a Behavior History Table (BHT) is used to record the data reuse. BHT collects reuse information from learning cache lines at different cache levels. In one implementation, each entry in the BHT is associated with a BHT identifier (BHTI), at least part of which is a dataset identifier (DID). Each BHT has some number of behavior counters (BC), which are updated each time a corresponding special usage for the dataset associated with the BHT entry is recorded. A BHT may be organized as an associative storage indexed by some of the BHTI bits and tagged by some of the BHTI bits. A BHT may also be organized as a table indexed by some BHTI bits, but with no tag.

When a special usage of a learning cache line is detected, an associated BHT entry is selected, at least in part by using the DID associated with the cache line. The behavior counter (BC) of the selected BHT entry corresponding to the special usage detected is incremented or decremented.

5. History-based policy: Based on the reuse information collected in a BHT, a policy can be determined for future operations to certain cache lines, regions, pages or other address ranges. The policy can for example be based on the assumption that the counter values collected for a dataset will be representative for the dataset's future behavior. For example, the counter for one or many BHT entries can be examined periodically and policies for future accesses to datasets corresponding to a BHT entry, or several BHT entries, can be determined. For example, for a dataset Z identified by a DID that has shown good reuse (e.g., reuse equal to or above a threshold value which may be set based on empirical analysis) at cache level X but not at cache level Y, the corresponding future policy is to install the dataset Z in cache level X, but not cache level Y. In another example, a dataset A, identified by a DID, that has shown a more frequent reuse than a dataset B, identified by a different DID, when accessing a cache with variable latency (e.g., a non-uniform cache architecture (NUCA)), then the future policy is to install dataset A in a faster portion of the cache and dataset B in a slower portion of the cache. In yet another example, for a dataset C, identified by a DID, that has shown a better reuse than a dataset D, identified by a different DID, and where dataset C has been identified to be accessed mostly by a CPU P, the future policy is to install dataset C in a cache or a portion of a cache with a shorter access with respect to CPU P, after which the appropriate placement for dataset D is determined.

The most recent policy decision for each BHT entry can be stored with the BHT entry. For example, before making an installation decision for a cache line of a dataset A identified be a specific DID, that DID can be used to find a corresponding entry in the BHT and its most recent policy used to guide the installation of the cache line.

Figure 3:
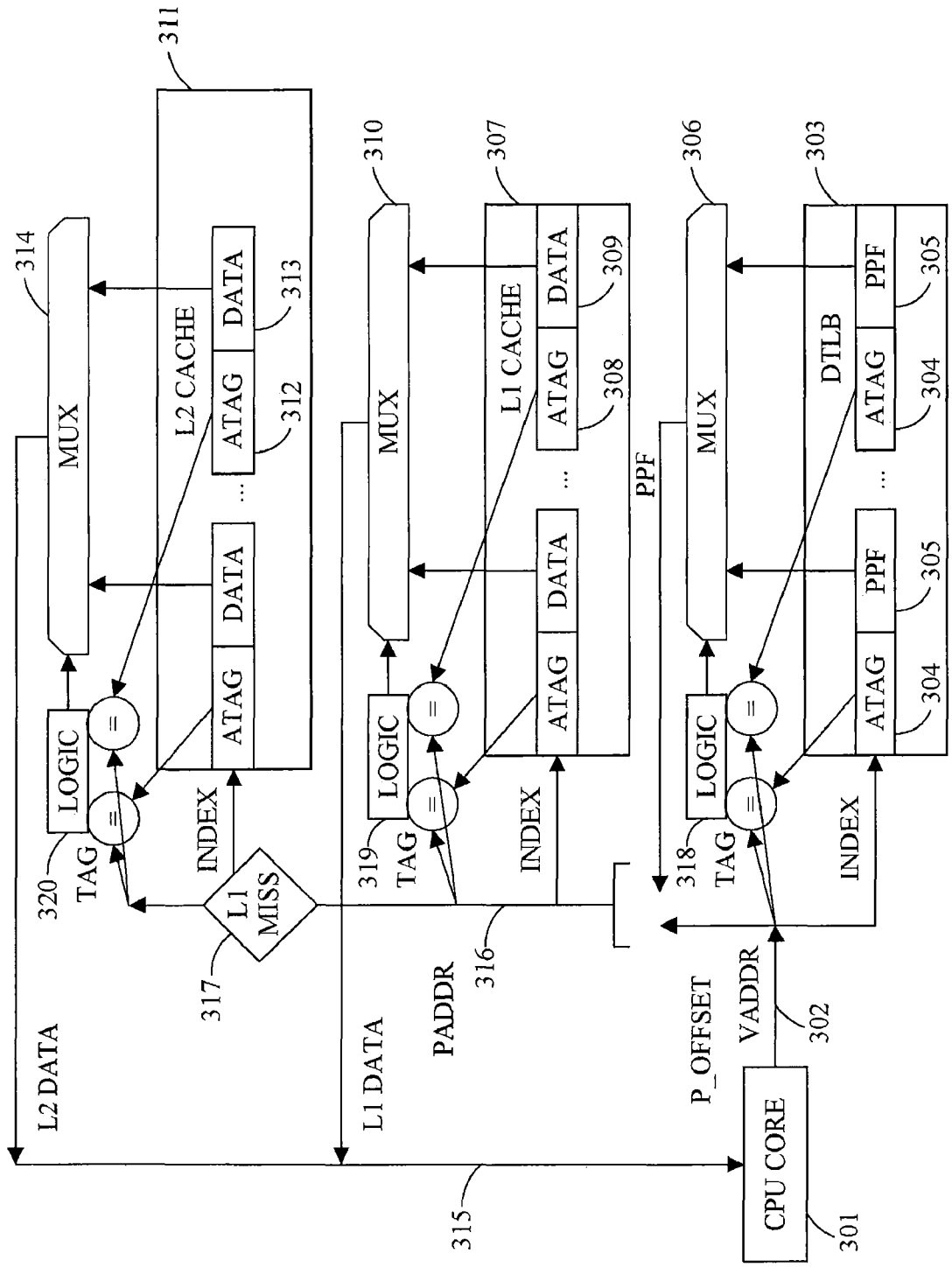
FIG. 3 is a block diagram for explaining a conventional implementation of a two-level cache hierarchy including set-associative caches and a set-associative data translation look-aside buffer (TLB)
Figure 8:
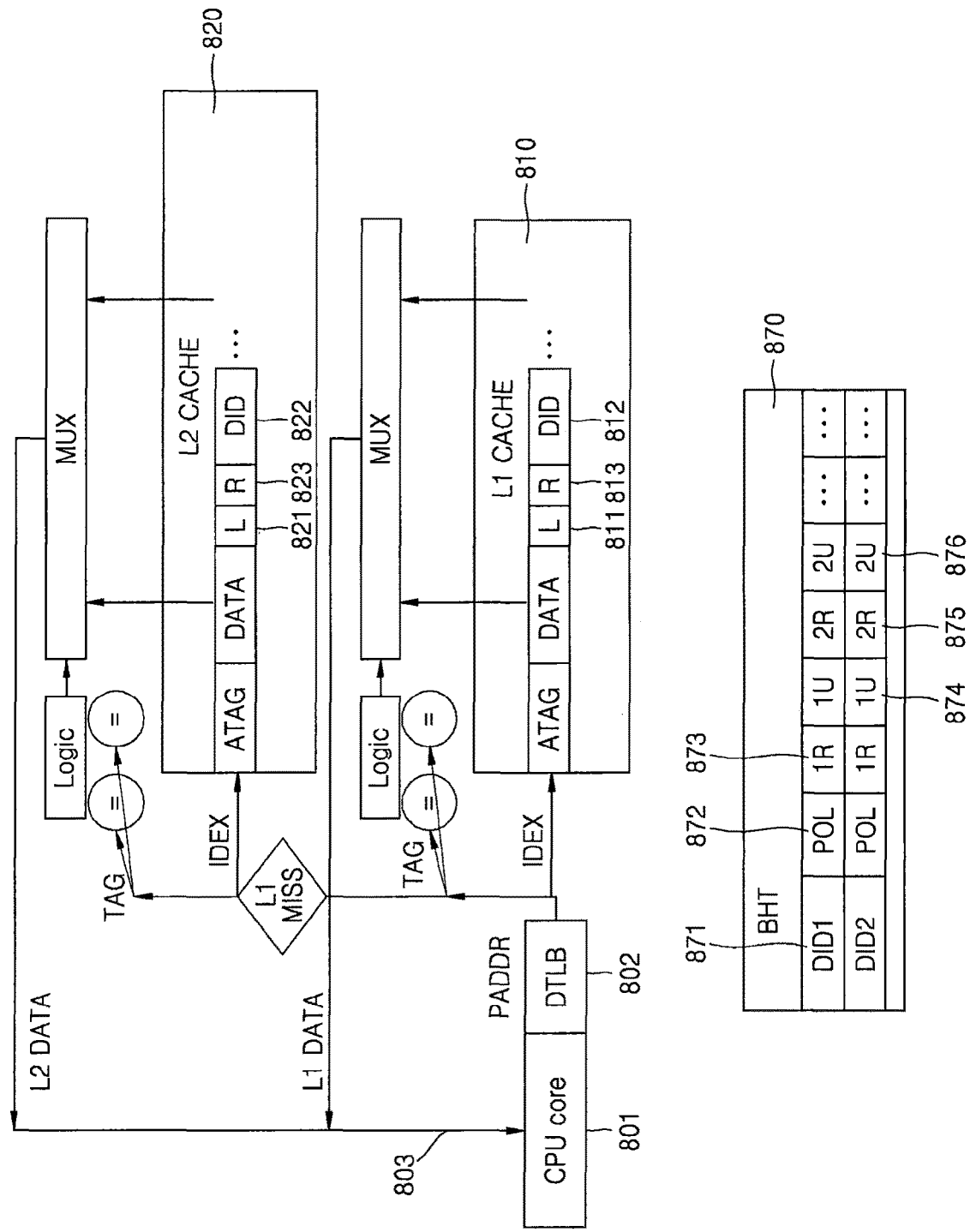
FIG. 8 is a block diagram illustrating a portion of a computer system including a tagged cache hierarchy extended to support a future behavior prediction (FBP) according to at least some example embodiments of the inventive concepts.

FIG. 8 is a block diagram illustrating a portion of a computer system including a tagged cache hierarchy extended to support a future behavior prediction (FBP) according to at least some example embodiments of the inventive concepts. FIG. 8 shows one example of an implementation based future behavior prediction (FBP) in a traditional cache hierarchy, i.e., with tagged caches rather than tag-less caches, according to at least one example embodiment of the inventive concepts that can be viewed as an extension of FIG. 3. Even though FIG. 8 only shows two cache levels, its functionality can be generalized to more than two cache levels. The two-level cache hierarchy shown in FIG. 8 may also form one node in a multiprocessor system built from many such nodes. Each cache line in the L1 cache 810 and in the L2 cache 820 has been extended with a reuse information field R (813 and 823), recording the reuse behavior of the cache line while it resides in the cache, a learning bit L (811, 821) indicating whether or not the corresponding cache line is a learning cache line, and a dataset DID field (812, 822), identifying a dataset with the corresponding cache line. The remaining unnumbered elements of the cache hierarchy of FIG. 8 function in the same way as corresponding elements illustrated in FIG. 3 and reference is made to the foregoing description of those elements above.

A behavior history Table (BHT) 870 has also been added. Each entry in the table 870 contains a dataset identifier DID 871, identifying the dataset associated with each table entry and for example used as an address tag to allow for associate lookups in the BHT 870 structure, and some reuse information collected for that dataset. In this implementation example, counters counting the number of learning cache lines with reuses at each level (1R, 2R, 3R . . . ) are shown (873, 875). Also counters counting the number of unused learning cache lines (1U, 2U, . . . ) are shown (874, 876). Based on the counter values, a placement policy for the dataset is selected. The current placement policy is stored in the policy field, POL 872. According to at least one example embodiment of the inventive concepts, the policy is represented by one bit for each level in the cache hierarchy indicating whether or not the dataset identified by DID 871 should be installed in that cache level. Those skilled in the art will understand that a similar functionality can be achieved using a multitude of different implementation choices, including some embodiments in FIG. 10, which is discussed in greater detail below.

Figure 10:
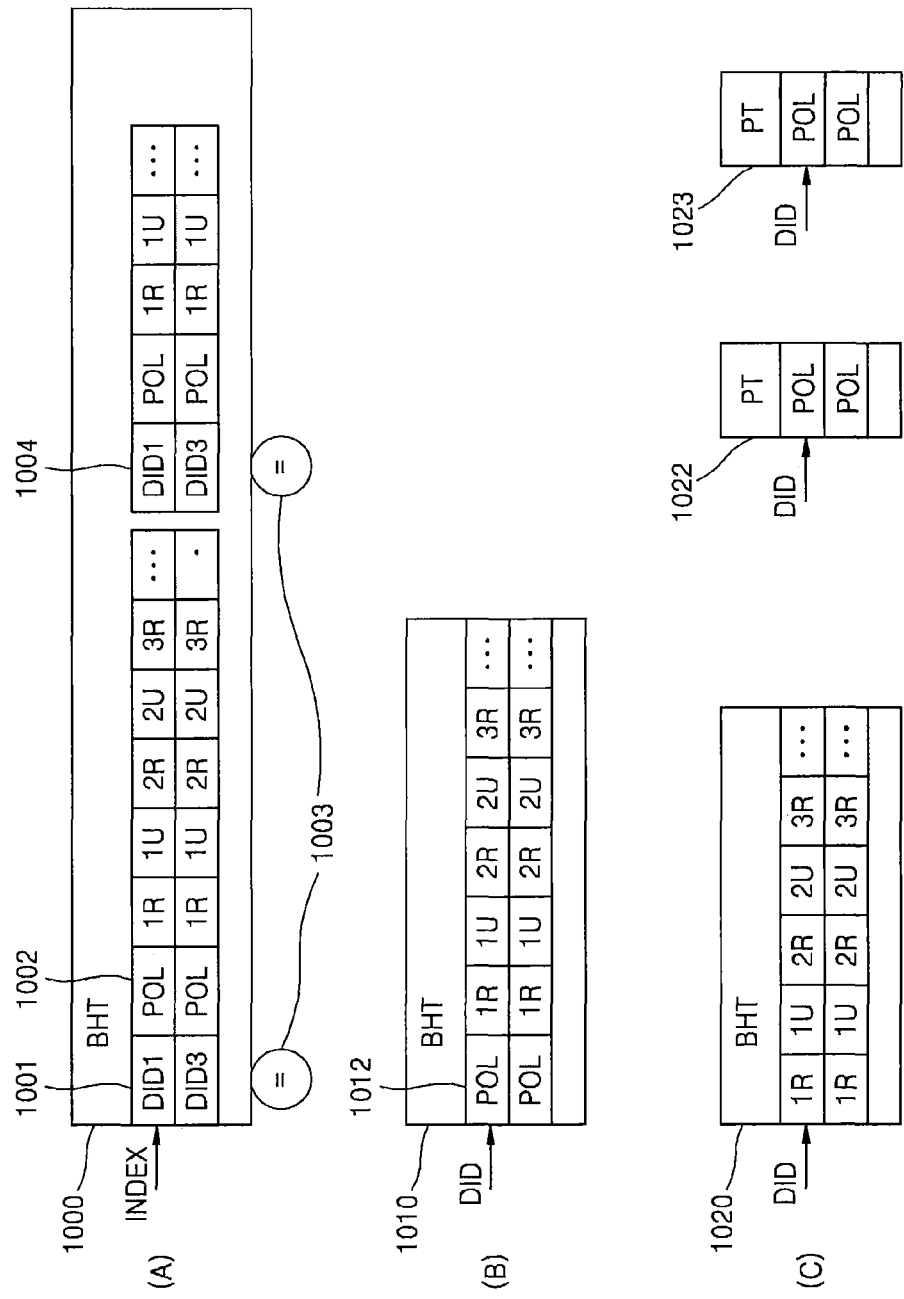
FIG. 10 is a block diagram showing three alternative ways to implement a behavior history table (BHT) according to at least some example embodiments of the inventive concepts.

FIG. 10 is a block diagram showing three alternative ways to implement a behavior history table (BHT) according to at least some example embodiments of the inventive concepts. Referring to FIG. 10, example (A) shows a set-associative BHT 1000, where some index function based in part on DID selects one set (the top-most set shown in this example) and all address tags of that set are compared to some lookup key to determine a hit. Part of the DIDs is used as address tags 1001 and 1004 to identify the set-associative entries in BHT 1000. In this example we assume a hit for 1001. Its BHT entry contains a set of counters, as discussed above, and some policy POL 1002 which has been determined by previous counter values. In example (B), some portions of a DID is used to select an index to access the BHT. The chosen single entry will be representative for that DID and all other DIDs with the same index function without any comparisons performed (in the example, the top-most entry is indexed using a DID and this entry used, for example the POL 1012 is used to determine the policy). Example (C) is a system with one BHT 1020 and several policy tables (PT 1022 and PT 1023), possibly distributed to be located close to each CPU core.

According to at least one example embodiment of the inventive concepts, FBP is used to make placement decisions for a cache hierarchy with four cache levels: 4 kB, 32 kB, 256 kB and 8 MB, respectively. Each cache entry is extended to store a learning bit (L), one or more reuse bits and a dataset identifier consisting of the 12 lowest bits of the PC value that brought the cache line from memory into the cache hierarchy. The BHT is organized as a set-associative cache with 256 sets of four ways each. A BHT entry contains a DID tag of 6 bit, a policy field of 4 bits (each corresponding to the four cache levels) and two counters U and R of 6 bits each for each cache level. When either of the two counters reaches its maximum value or, alternatively, a threshold value, a decision is made to install data in the corresponding cache level if the corresponding R counter value is higher than the threshold, e.g., 48. Over a wide set of applications, FBP according to these embodiments is shown to make substantially fewer installations at each cache level. On average, FBP performs fewer than 50% of the installs compared with a standard cache hierarchy with no placement policy.

Figure 4:
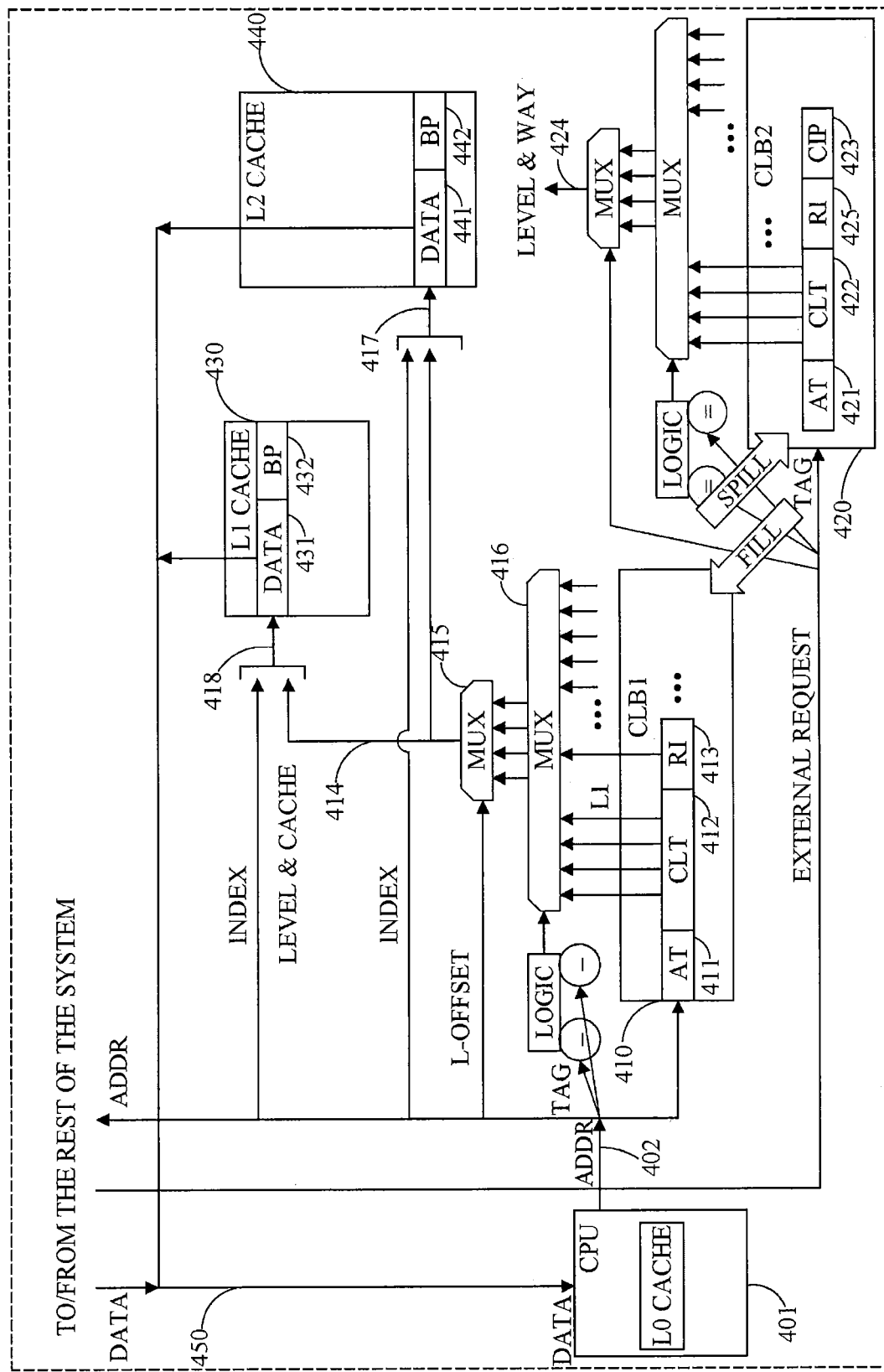
FIG. 4 is a block diagram illustrating an example implementation of a tag-less cache.
Figure 5:
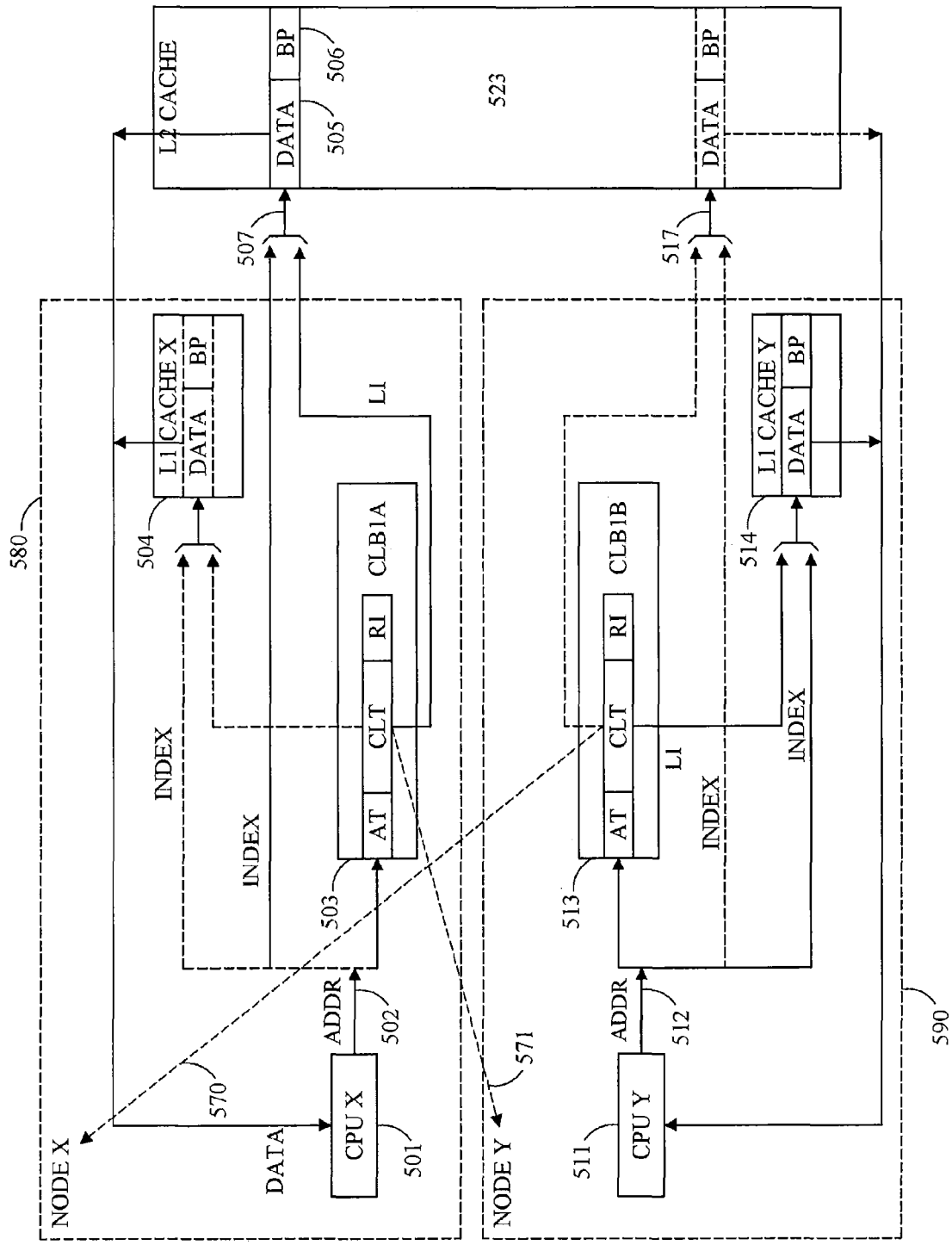
FIG. 5 is a block diagram illustrating a portion of a computer system including two CPUs connected to a two-level cache hierarchy and a two-level cache location buffer (CLB) hierarchy.
Figure 9:
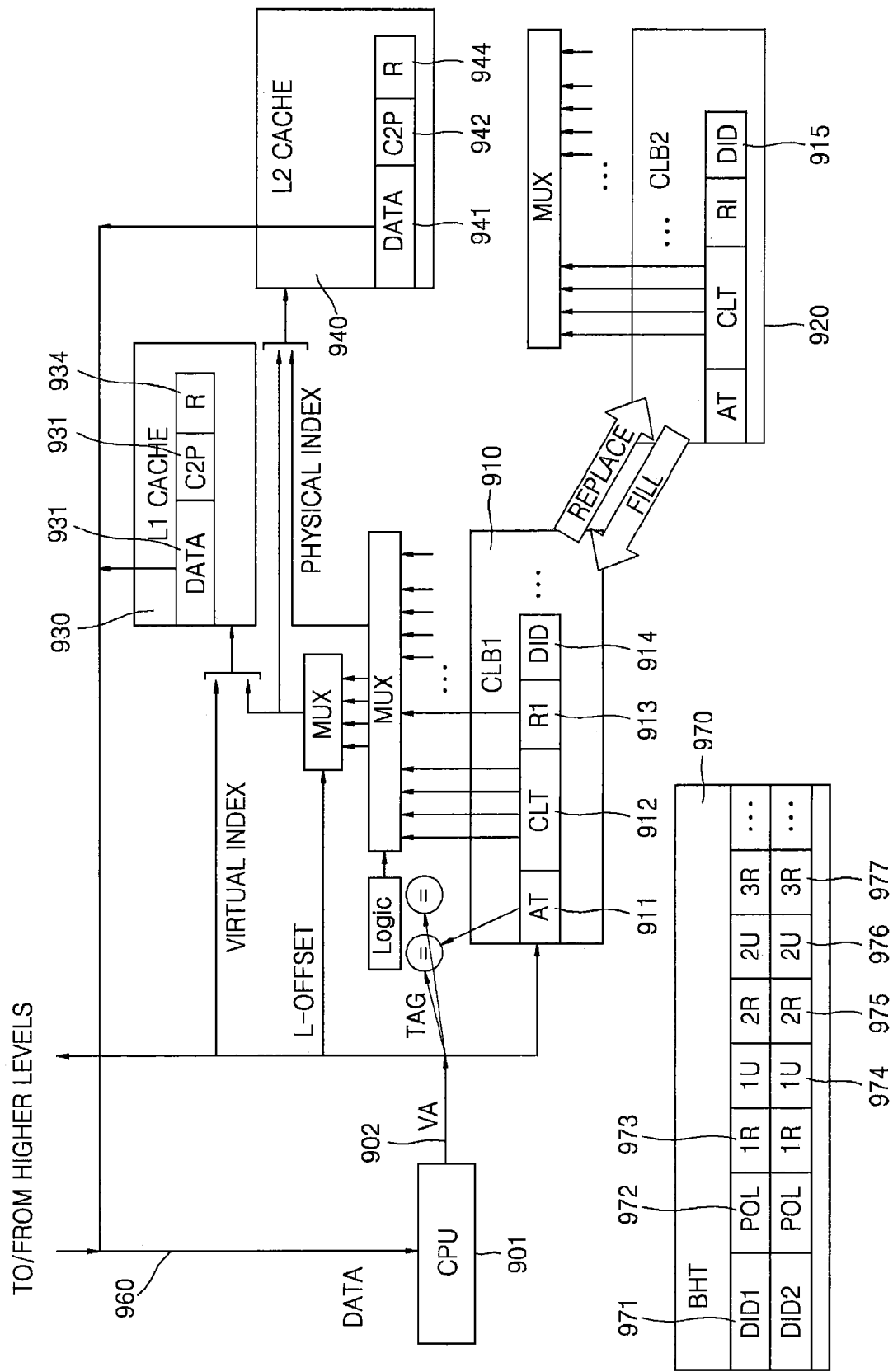
FIG. 9 is a block diagram illustrating a portion of a computer system including a tag-less cache hierarchy extended to support a future behavior prediction (FBP) according to at least some example embodiments of the inventive concepts.

FIG. 9 is a block diagram illustrating a portion of a computer system including a tag-less cache hierarchy extended to support a future behavior prediction (FBP) according to at least some example embodiments of the inventive concepts. FIG. 9 shows an example of an implementation of FBP in a tag-less cache hierarchy according to at least another example embodiment of the inventive concepts, which can be viewed as an extension of FIG. 4. Even though FIG. 9 only shows two cache levels, its functionality can be extended to more than two cache levels. Each cache line in L1 cache 930 and L2 cache 940 has been extended with a reuse information field R 934 and 944, recording the reuse behavior of the cache line while it resides at each cache level, and a dataset DID field, identifying a dataset of the cache line. In this example, a dataset identifier (DID) has not been added to each cache line in the L1 and L2 caches. Each entry in CLB1 910 and CLB2 920 have instead been extended with DID information 914 and 915, respectively, associated with each of their entries. The C2P pointers 932, 942 of each cache line in L1 cache 930 and L2 cache 940 point to entries in CLB2 920 (that may in turn may point to CLB1 910). The DID of the associated CLB 2 entry 915 determines the dataset ID for each cache line in L1 cache 930 and L2 cache 940. The remaining elements in this portion of FIG. 9 function in the same way as those described above with respect to FIG. 8 and reference is made to that description for conciseness.

A Behavior history Table (BHT) 970, similar to the one in FIG. 8, has also been added to the system of FIG. 9. Each entry in the table contains a dataset DID 971, identifying the dataset associated with each table entry, and some reuse information collected for that dataset. In this example, counters counting the number of reuses at each level 1R, 2R, 3R, . . . are shown and referenced as 973, 975, 977, respectively. Also counters counting the number of unused cache lines 1U, 2U, . . . are shown and referenced as 974 and 976. Based on the counter values, a placement policy 972 for the dataset is shown. Those skilled in the art will appreciate that a similar functionality can be achieved using a multitude of different implementation choices.

The BHTs shown in FIGS. 8 and 9 may be part of multiprocessor configurations, where the CPU and caches shown in the FIGS. form nodes which are part of multicore configurations built from two or more such nodes. In such configurations, a BHT may be local to the node and information about collect special usage in the nodes, or global to the multiprocessor and information about special usage across all the nodes in the multiprocessor. According to at least one example embodiment of the inventive concepts, a multiprocessor may have both BHTs local to its node and a global BHT.

As earlier discussed, a dataset may be identified at least in part by a PC value of an instruction that generated at least one of the "cache line requests" that caused a hardware prefetch stream to start. This dataset will select learning accesses like any other dataset and learn the best placement strategy across the cache levels for the prefetched dataset, similarly to any other dataset described in accordance with one or more example embodiments of the inventive concepts.

Figure 11:
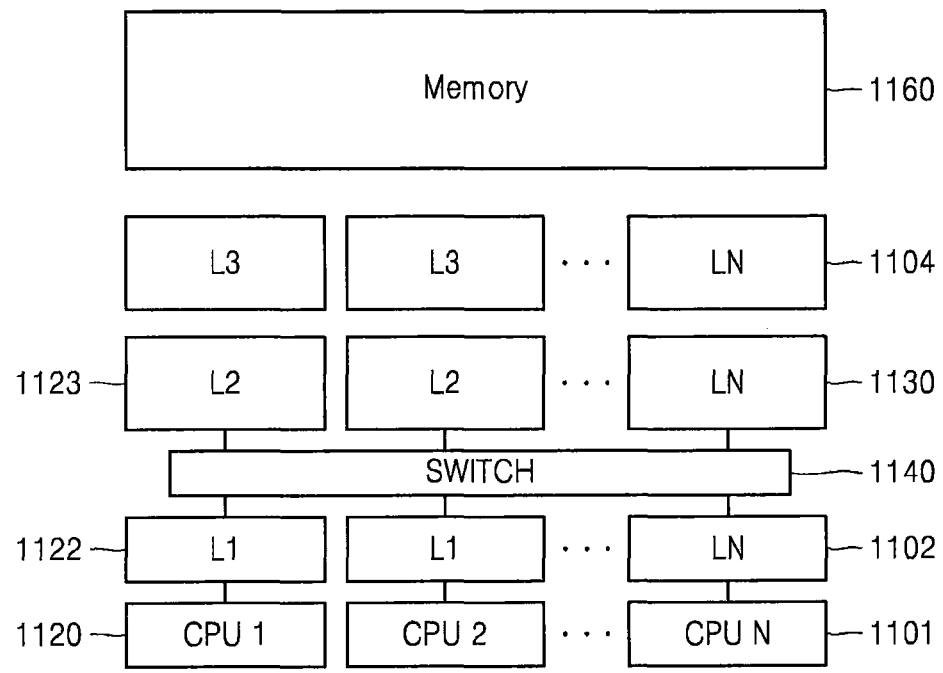
FIG. 11 is a block diagram showing a portion of a computer system including a non-uniform cache architecture (NUCA) cache system, where both the L2 and L3 are non-uniform caches, according to at least some example embodiments of the inventive concepts.

So-called non-uniform cache architectures (NUCA) are becoming more common. NUCA refers to a multiprocessor system where one or more cache levels are logically shared between the cores, but physically distributed between the cores. In a NUCA system, a core will have a shorter access time to "its slice" of the shared NUCA cache than to some other slice of the NUCA shared cache. FIG. 11 is a block diagram showing a portion of a computer system including a non-uniform cache architecture (NUCA) cache system, where both the L2 and L3 are non-uniform caches, according to at least some example embodiments of the inventive concepts. FIG. 11 shows a NUCA multicore system, where CPUs 1101 and 1120 both have private L1 caches 1102 and 1122, respectively. The L2 cache is a logically shared NUCA cache implemented by separate L2 slices (e.g., 1103 and 1123), which are connected to the CPU by a SWITCH 1140. Each CPU, (e.g., 1101 and 1120) can access all the L2 slices but has a shorter access time to their L2 slice (1103 and 1123, respectively). Each L2 slice also has an adjacent L3 slice. The L3 slices form a logically shared NUCA cache in a similar way in that CPU 1101 has a shorter access time to the L3 1104 of its slice than to any other L3 slice. However, the access time to an L3 slice is substantially longer than the access time to the adjacent L2 slice. We refer to this L2/L3 NUCA structure with NUCA caches of two levels as a two-dimensional NUCA array.

It would be beneficial if cache lines could be placed close to the core accessing them. It would also be beneficial to place the most frequently reused cache lines in the L2 cache rather than in the L3 cache. In a NUCA, such as the one shown in FIG. 11, the access cost to each L2 and L3 slice can be determined based on the latency cost, communication cost and energy cost for an access starting at each CPU and accessing each of the L2 and L3 slices.

Figure 6:
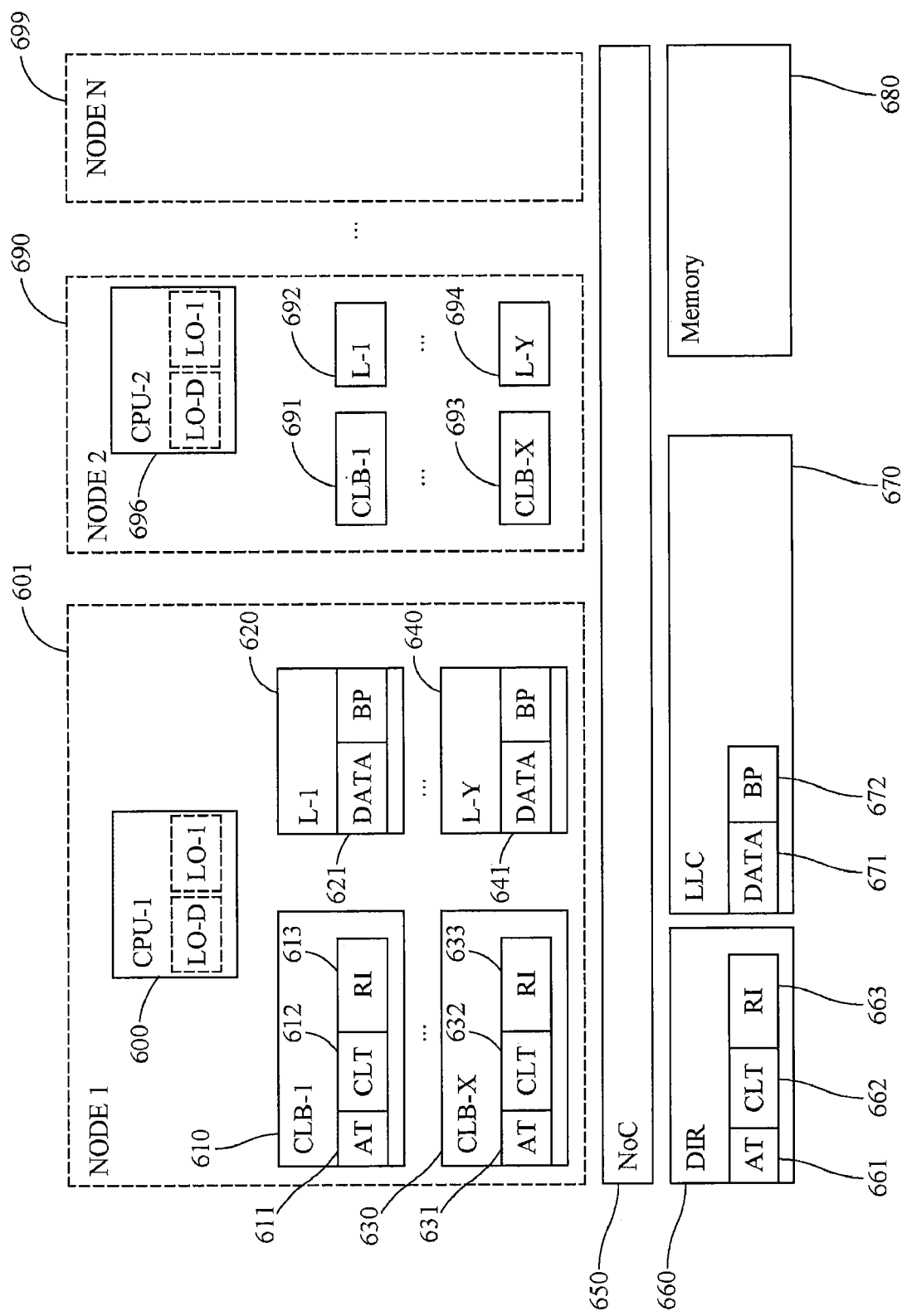
FIG. 6 is a block diagram illustrating a portion of a computer system including a tag-less cache hierarchy with a single monolithic last level cache.
Figure 7:
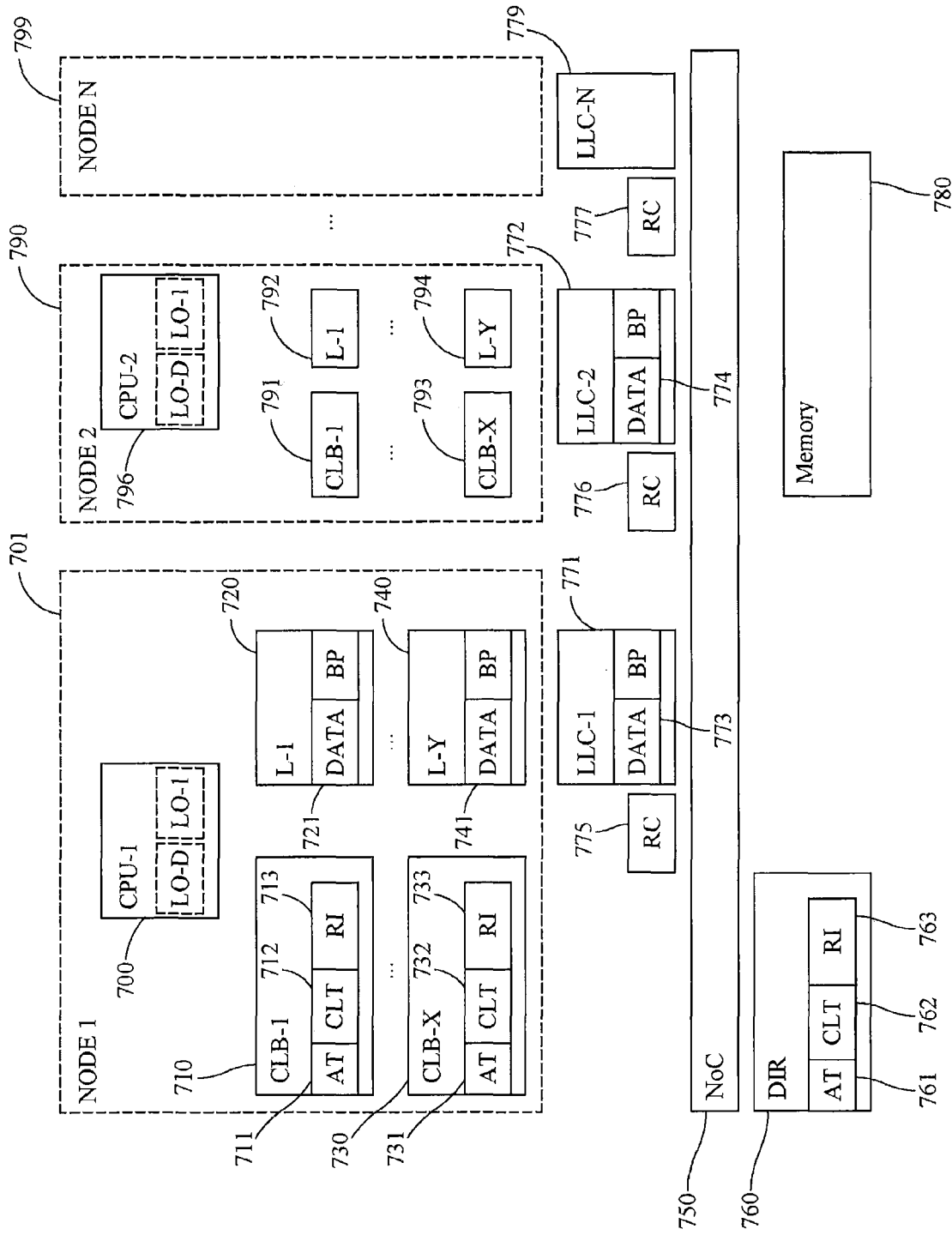
FIG. 7 is a block diagram illustrating a generalized tag-less cache hierarchy with many slices of last level cache.

A NUCA Aware Placement algorithm (NAP) is a specialized implementation of FBP targeting desirable or, alternatively, optimal cache line placements in NUCA systems. The initial NAP description targets a tag-less NUCA system, e.g., the system depicted in FIGS. 6, 7 and 9 modified to have NUCA L2 and L3 NUCA caches and have its BHT table 970 replaced by the NUCA history table (NHT) 1210, which will be discussed in greater detail below with reference to FIG. 12. A similar NAP algorithm can also be applied to tag-based NUCA systems, e.g., FIG. 8 modified to have L2 and L3 NUCA caches and its BHT table 870 replaced by the NUCA history table (NHT) 1210, which will be discussed in greater detail below with reference to FIG. 12.

A NAP identifies the dataset of each region with a DID, as shown in FIG. 9 (e.g., 914 and 915) and may have specially assigned learning regions, which are marked by a dedicated L bit (not explicitly shown) within the Region Information field (913).

Figure 12:
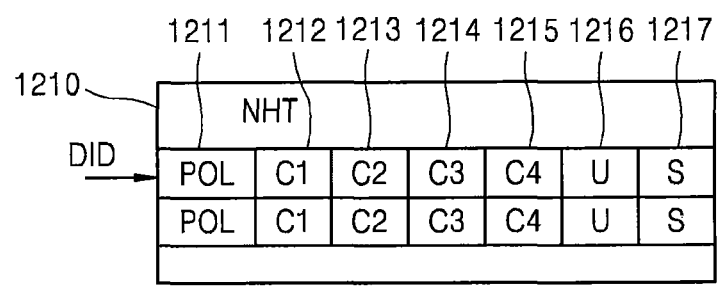
FIG. 12 is a block diagram showing a behavior history table (BHT) targeting NUCA placement, according to at least some example embodiments of the inventive concepts.

FIG. 12 is a block diagram showing a behavior history table (BHT) targeting NUCA placement, according to at least some example embodiments of the inventive concepts. Referring to FIG. 12, FIG. 12 shows the NUCA History Table (NHT) 1210 used by the NAP placement mechanism. Similar to FBP, this table can be represented in many ways. The representation shown in FIG. 12 is similar to the FBP representation (B) of FIG. 10 (1010). The goal of NAP is to determine the policy (POL 1211) for the associated DID used to index to the NHT entry. To assist with policy determination, each NHT entry stores a number of counters updated by special usage to cache lines associated with the entry.

According to at least one example embodiment of the inventive concepts, there is one reuse counter per core, shown as C1, C2, C3 and C4 of FIG. 12 (1212, 1213, 1214, 1215 respectively), assuming four CPUs (cores) in the system. According to at least one example embodiment of the inventive concepts, a size counter S (1217) is used to estimate the size for the data structures associated with the NHT entry. According to at least one example embodiment of the inventive concepts, an "unused counter" counts the number of cache lines being replaced before a single reuse to the cache line has occurred.

The per-core reuse counters of a NAP entry are incremented each time when a learning cache line in L2 or L3 associated with the entry is accessed by the corresponding core. According to at least one example embodiment of the inventive concepts, each counter is incremented only for accesses of a certain type, for example only for read accesses. According to at least one example embodiment of the inventive concepts, each counter is incremented for all accesses and not just for learning cache lines.

The size counters of a NAP entry are incremented each time a data unit associated with the entry is brought into the cache system and decremented each time a data unit (e.g., a data unit associated with the entry) is evicted from the cache system. According to at least one example embodiment of the inventive concepts, the size counter of a NAP entry is incremented/decremented each time a CLB region associated with the entry is allocated/evicted at some level of the CLB hierarchy. According to at least one example embodiment of the inventive concepts, the size counter of a NAP entry is incremented/decremented each time a page associated with the entry is allocated/evicted at some level of the TLB hierarchy. According to at least one example embodiment of the inventive concepts, the allocation and eviction of some other data entity associated with the entry will increment and decrement the size counter.

According to at least one example embodiment of the inventive concepts, an NHT entry contains an "unused" counter U 1216. The "unused" counter 1216 is incremented each time a data unit that has never been reused at a certain cache level is evicted from that cache level. According to at least one example embodiment of the inventive concepts, the unused counter is incremented each time a data unit that has never been reused at certain caches level is evicted past a certain cache level, for example the data unit has never been reused in the L2 or L3 levels and is evicted to a cache level higher than L3 or to memory. The unused counter 1216 can be used to determine that a dataset should bypass the L2/L3 caches and only be installed in L1 cache.

Periodically, the placement policy in the NUCA hierarchy is reassessed based on data collected in the NHT 1210. This could for example be after a certain number of instructions have executed, after a number of memory accesses have been performed, after some number of cycles of execution or when some counter has reached a threshold or, alternatively, predetermined value. Someone skilled in the art would appreciate that many other forms to determine the next placement reassessment could be used.

During the placement reassessment, NHT entries are ordered according to some priority. According to at least one example embodiment of the inventive concepts, NHT entries are ordered by their total reuse count in relationship to their size, e.g., by dividing their total reuse count by their size count or some other way to estimate the relationship. According to at least one example embodiment of the inventive concepts, the total reuse count can be calculated by adding up the individual per-core reuse counters 1211, 1212, 1213, 1214. According to at least one example embodiment of the inventive concepts, the total reuse count is recorded by a separate counter in each NHT entry.

During the placement reassessment, a placement policy for each dataset in NHT is determined in some priority order, where each dataset corresponds to an NHT entry. The highest priority dataset is placed in a cache with a lowest cost function with respect to the core or cores accessing the dataset. According to at least one example embodiment of the inventive concepts, the cost function is taking the latency and/or the communication cost from the core to the cache into account. According to at least one example embodiment of the inventive concepts, the power estimate for an access from the core to the cache is taken account. According to at least one example embodiment of the inventive concepts, the estimated size of the dataset is taken into account. If the dataset size is deemed be appropriate to fit into the selected cache, a portion of that cache proportional to the size of the dataset is marked as being used. If the dataset size is deemed too large to fit into the selected cache, the entire cache is marked as used and the remaining portion of the dataset is fitted into the cache with the second lowest cost function, and so on until the entire dataset has been fitted. According to at least one example embodiment of the inventive concepts, the fraction of the dataset fitted into each cache is recorded as the placement policy for the dataset, for example 25% of the dataset is placed in the L2 cache of CPU1's slice, 25% of the dataset is placed in the L2 cache of CPU2's slice and 50% of the dataset is placed in the L3 cache of CPU1's slice. When the highest priority dataset has been placed, the second highest dataset is placed in the caches not yet marked as used, and so on until all datasets not deemed to bypass L2/L3 have been placed.

According to at least one example embodiment of the inventive concepts, some datasets will be determined to bypass the L2/L3 NUCA caches and will not be placed in any of its caches. According to at least one example embodiment of the inventive concepts, the remaining datasets are placed according to some dataset size distribution between the caches. According to at least one example embodiment of the inventive concepts, the placement will strive to achieve the same ratio between dataset size placed in each cache and its actual size. According to at least one example embodiment of the inventive concepts, the placement will strive to achieve the same cache pressure between the cache slices, where cache pressure for example can be measured as the number of evictions from the cache per time used in relationship to its size. According to at least one example embodiment of the inventive concepts, the placement will strive towards a desired or, alternatively, predetermined relationship between cache pressure for caches at one level (e.g., L2) and some other level (e.g., L3). According to at least one example embodiment of the inventive concepts, the placement is striving towards achieving the same replacement age between cache lines replaced from all the caches, defined as how long time a cache line is unused in the cache until it is replaced. According to at least one example embodiment of the inventive concepts, the placement will strive towards a desired or, alternatively, predetermined relationship between replacement age for caches at one level (e.g., L2) and some other level (e.g., L3).

The new determined placement is recorded as a new placement policy and is recorded as a policy associated with each dataset, e.g., in a policy field of the NHT entry of the corresponding dataset 1211 and/or in separate policy tables similar to 1022 or 1023 or with some other representation. Future installation of data into the NUCA hierarchy will adhere to the placement policy, for example 25% of the dataset is installed in the L2 cache of CPU1's slice, 25% of the dataset is installed in the L2 cache of CPU2's slice and 50% of the dataset is installed in the L3 cache of CPU1's slice.

According to at least one example embodiment of the inventive concepts, the size and reuse frequency for each dataset is estimated. Periodically, a new global placement decision is made. First, the dataset with the highest reuse per size is placed in its most favorable spot. Then the dataset with the second highest frequency/size is placed and so on until all known sets have been placed using a simple eager packing algorithm. The goal of the placement is to place datasets with the highest reuse probability close to the core using it.

While this discussion has centered around predicting future access patterns for a dataset and to leverage this prediction to achieve an efficient NUCA placement with respect to a cache hierarchy similar to that of FIG. 11, someone skilled in the art would realize that the method described can be generalized to predict many other kinds of future behavior and to apply modification or, alternatively, optimization policies for future operations.

Figure 13:
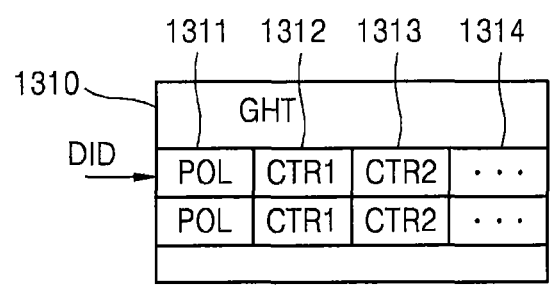
FIG. 13 is a block diagram showing a behavior history table (BHT) targeting general prediction and modification or, alternatively, optimization in a computer system, according to at least some example embodiments of the inventive concepts.

FIG. 13 is a block diagram showing a behavior history table (BHT) targeting general prediction and modification or, alternatively, optimization in a computer system, according to at least some example embodiments of the inventive concepts. FIG. 13 depicts a generalized General History Table (GHT), where DID is used to associate a dataset identified by this DID with a GHT entry. The GHT entry contains some number of counters, which for example counts any of the so-called hardware counters present in most modern computer systems that are configured to count one of multitude different events. Any existing or future counter counting events can be used as such a counter. As shown in FIG. 13, the counting of these events is here organized to count such events associated with the dataset DID for which the event occurred. While the FIG. shows two counters: CTR1 and CTR2 (1312, 1313), the number of counters per GHT entry is not bound to two. The counters can be used to determine some policy for the dataset, for example stored within the GHT entry itself as shown by 1311. However, there are many other ways the per-dataset counters can be and their policy can be organized, including but not limited to the organizations depicted in FIG. 10.

Someone skilled in the art can for example understand how a multitude of future behavior can be detected using this method, including but not limited to: read-mostly cache lines, mostly-private regions, write-mostly cache lines, mostly migratory-sharing cache lines, mostly producer-consumer cache lines, mostly write-once cache lines, mostly read-once cache lines, regions or pages with mostly on cache line access, mostly sparse cache lines, mostly compressible cache lines can be predicted using this method. Most of these future behaviors have known modifications or, alternatively, optimizations which can be applied for their future usage of the respective dataset.

For clarity, most descriptions herein generally describe techniques for how a cache line is located and returned to a requesting CPU. The descriptions do not describe in detail the various ways in which a requested word contained within the cache line is selected and returned to the CPU. However, various methods for selecting a requested word contained within a cache line and returning the requested cache line to the CPU are known by those skilled in the art.

For clarity, most descriptions herein describing the handling of data of cache hierarchies describe exclusive cache hierarchies. Those skilled in the art would understand that one or more example embodiments of the inventive concepts can be extended to also cover inclusive memory hierarchies and non-exclusive memory hierarchies.

Figure 2:
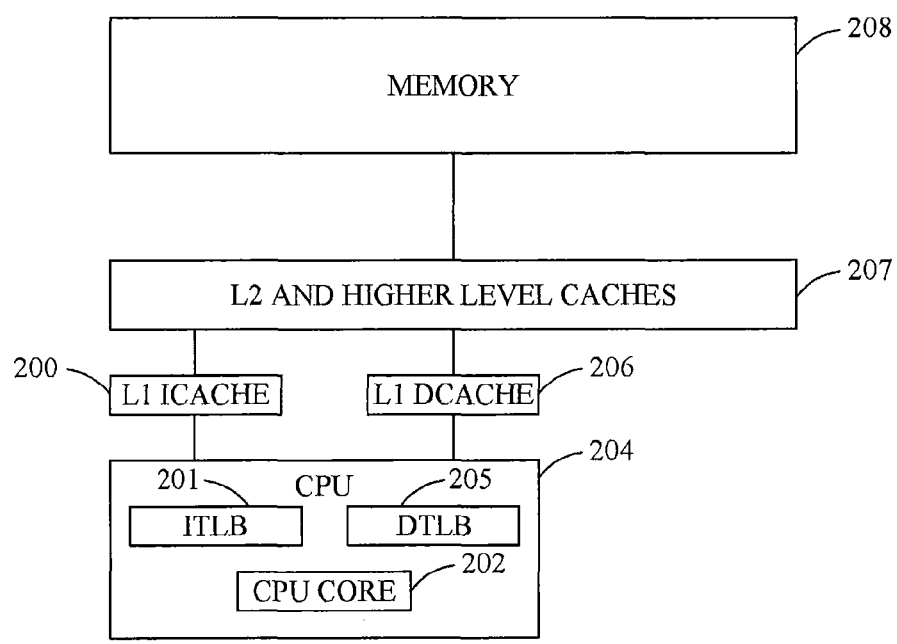
FIG. 2 is a block diagram explaining an example cache hierarchy of a computer system.

Although one or more example embodiments of the inventive concepts described above are useful in association with both uni-processor systems and multi-processor system, such as those illustrated and described above with respect to FIGS. 1 and 2 respectively, one or more example embodiments of the inventive concepts are illustrated primarily in association with a uniprocessor system. However, those skilled in the art will appreciate that one or more example embodiments of the inventive concepts illustrated in association with a uni-processor system are not limited to such an implementation.

Although described above in the context of certain example computer architectures, caching exists in many other settings within, as well as outside, the example computer systems illustrated in FIGS. 8-13, and those skilled in the art will understand that at least some example embodiments of the inventive concepts described above within the context of computer system may also be applied to such other contexts. An example of such usages is the virtual memory system which caches data from a slow, high-capacity storage, such as a disk or FLASH memories, into a faster and smaller high-capacity memory that could be implemented using dynamic RAM. Other examples of caching in a computer system include, but are not limited to, disk caching, web caching and name caching. The organization and caching mechanisms of such caches may vary from those of the caches discussed above, e.g., variances in the size of a set, their implementation of sets and associativity, etc. Regardless of the implementation of the caching mechanism itself, at least some example embodiments of the inventive concepts are applicable for implementing the various caching schemes.

The methods or flow charts provided in the present application may be implemented in a computer program, software, or firmware tangibly embodied in a computer-readable storage medium for execution by a general purpose computer or a processor.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A data management method for a multi-core processor system including a plurality of processor cores, a plurality of caches, and a behavior history table, the plurality of caches including first caches of a first cache level and second caches of a second cache level, the method comprising:
    tracking reuse information of learning cache lines stored in at least one cache of the first caches or the second caches;
    recording the reuse information in the behavior history table;
    determining a placement policy with respect to future operations that are to be performed on a plurality of cache lines stored in the first caches or the second caches, based on the reuse information in the behavior history table, wherein
        the second cache level is at a higher level than the first cache level,
        each of the first caches are private to a corresponding processor core among the plurality of processor cores,
        the second caches are shared among the plurality of processor cores,
        the reuse information includes a plurality of reuse counters corresponding, respectively, to the plurality of processor cores, and
        each reuse counter, from among the plurality of reuse counters, corresponds to a different one processor core from among the plurality of processor cores;
    incrementing the reuse counters each time learning cache lines stored in the second caches are accessed by the corresponding processor core;
    calculating a total reuse count by adding up the reuse counters; and
    recording the total reuse count by a separate counter in the behavior history table.

2. The method of claim 1, wherein the method further comprises:
    updating, by the multi-core processor system, at least one behavior counter from among a plurality of behavior counters included in the reuse information each time a type of usage corresponding to the at least one behavior counter occurs with respect to at least one of the learning cache lines.

3. The method of claim 2, wherein the method further comprises:
    updating, by the multi-core processor system, at least one behavior counter from among the plurality of behavior counters each time at least one of the learning cache lines is accessed by a read request.

4. The method of claim 1, further comprising:
    storing the determined placement policy in the behavior history table.

5. The method of claim 1, further comprising:
    randomly selecting at least some cache lines among the plurality of cache lines stored in at least one cache of the first caches or the second caches as the learning cache lines.

6. The method of claim 1,
    wherein the plurality of processor cores includes a first core and a second core, and
    wherein the first core has a shorter access time to at least one cache of the first caches than the second core, and the second core has a shorter access time to at least one cache of the second caches than the first core.

7. A multi-core processor system comprising:
a plurality of processor cores; and
a plurality of caches; and a behavior history table,
the plurality of caches including first caches of a first cache level and second caches of a second cache level higher than the first cache level, the first and second cache levels being different cache levels with respect to each other,
wherein, at least one processor core from among the plurality of processor cores is configured to determine a placement policy with respect to future operations that are to be performed on a plurality of cache lines stored in at least one cache of the first caches or the second caches, based on reuse information recorded in a behavior history table,
wherein the reuse information is information about reuse of learning cache lines is stored in at least one cache of the first caches or the second caches,
the reuse information including a plurality of reuse counters corresponding, respectively, to the plurality of cores,
wherein each reuse counter, from among the plurality of reuse counters, corresponds to a different one processing core from among the plurality of processing cores,
wherein each of the first caches are private to a corresponding processor core among the plurality of processor cores,
wherein the reuse counters are incremented each time the learning cache lines stored in the second caches is accessed by the corresponding processor core, and
wherein a total reuse count calculated by adding up the reuse counters is recorded by a separate counter in the behavior history table.

8. The system of claim 7, wherein the at least one processor core is configured to update at least one reuse counter from among the plurality of reuse counters each time a type of usage corresponding to the at least one reuse counter occurs with respect to at least one of the learning cache lines.

9. The system of claim 7, wherein the behavior history table includes at least one unused counter, and the at least one processor core is configured to update the at least one unused counter each time at least one of the learning cache lines is replaced before a single reuse of the learning cache lines has occurred.

10. The system of claim 7, wherein the behavior history table includes a policy field that stores a policy in accordance with the placement policy determined by the at least one processor core.

11. The system of claim 7, wherein each of the learning cache lines is extended with a reuse information field that is configured to store reuse information of the learning cache lines.

12. The system of claim 7, wherein each learning cache line is extended with a learning bit indicating that the learning cache line is a learning cache line.

13. A non-transitory computer-readable storage medium comprising instructions that, when executed by at least one processor core of a multi-core processor system including a plurality of processor cores, a plurality of caches, and a behavior history table, the plurality of caches including first caches of a first cache level and second caches of a second cache level, cause the at least one processor core to perform operations including,
tracking reuse information of learning cache lines stored in at least one cache of the first caches or the second caches;
recording the reuse information in the behavior history table;
determining a placement policy with respect to future operations that are to be performed on a plurality of cache lines stored in the first caches or the second caches, based on the reuse information in the behavior history table, wherein
the second cache level is at a higher level than the first cache level,
each of the first caches are private to a corresponding processor core among the plurality of processor cores,
the second caches are shared among the plurality of processor cores,
the reuse information includes a plurality of reuse counters corresponding, respectively, to the plurality of processor cores, and
each reuse counter, from among the plurality of reuse counters, corresponds to a different one processor core from among the plurality of processor cores;
Incrementing the reuse counters each time learning cache lines stored in the second caches are accessed by the corresponding processor core;
calculating a total reuse count by adding up the reuse counters; and
recording the total reuse count by a separate counter in the behavior history table.

* * * * *